(12) United States Patent
Clark et al.

(10) Patent No.: US 6,321,070 B1
(45) Date of Patent: Nov. 20, 2001

(54) PORTABLE ELECTRONIC DEVICE WITH A SPEAKER ASSEMBLY

(75) Inventors: Joel A. Clark, Woodridge; Scott R. Wilcox, Chicago, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/079,067

(22) Filed: May 14, 1998

(51) Int. Cl.[7] ....................................................... H04B 1/38
(52) U.S. Cl. .............................. 455/90; 455/347; 455/350
(58) Field of Search .............................. 455/550, 90, 347, 455/350, 351, 575; 381/337, 338, 345, 348, 349, 351, 352, 353–354, 159, 160–163, 145–146, 150, 188, 157, 168, 169, 183, 187, 155, 156; 379/433, 428, 420

(56) References Cited

U.S. PATENT DOCUMENTS

| | | | | |
|---|---|---|---|---|
| 3,696,886 | * | 10/1972 | Armstrong | 181/31 B |
| 4,413,198 | * | 11/1983 | Bost | 310/324 |
| 4,719,322 | * | 1/1988 | Guzik et al. | 200/5 |
| 4,728,933 | * | 3/1988 | Mazza | 340/388 |
| 5,134,659 | * | 7/1992 | Moseley | 381/72 |
| 5,471,019 | * | 11/1995 | Maire | 181/156 |
| 5,610,992 | | 3/1997 | Hickman . | |
| 5,615,259 | * | 3/1997 | Gilbert | 379/433 |
| 5,711,013 | * | 1/1998 | Collett et al. | 455/558 |
| 5,721,787 | | 2/1998 | Neibauer et al. . | |
| 5,729,605 | * | 3/1998 | Bobisuthi et al. | 381/430 |
| 5,790,679 | * | 8/1998 | Hawker et al. | 381/163 |
| 5,963,640 | * | 10/1999 | Rabe | 379/433 |
| 5,974,157 | * | 10/1999 | Tajima et al. | 381/354 |
| 6,002,949 | * | 12/1999 | Hawker et al. | 455/569 |
| 6,011,699 | * | 1/2000 | Murray et al. | 361/814 |
| 6,058,315 | * | 5/2000 | Clark | 455/550 |
| 6,064,894 | * | 5/2000 | Zurek et al. | 455/569 |

FOREIGN PATENT DOCUMENTS

| | | | |
|---|---|---|---|
| 0 364 935 A1 | 4/1990 | (EP) | H04M/1/03 |
| 2 311 187 A | 9/1997 | (GB) | H04M/1/03 |
| 2337396A | * 11/1999 | (GB) | H04M/1/03 |
| 61-123388 | 6/1986 | (JP) | H04R/1/28 |
| 61-139189 | 6/1986 | (JP) | H04R/1/28 |
| WO 97/47117 | 12/1997 | (WO) | H04M/1/60 |

\* cited by examiner

*Primary Examiner*—Daniel Hunter
*Assistant Examiner*—C. Chow
(74) *Attorney, Agent, or Firm*—John J. Oskorep; Michael C. Soldner

(57) ABSTRACT

A portable electronic device, such as a portable radiotelephone (100), with a speaker assembly is described. The portable radiotelephone (100) has a housing, which includes an upper housing (102) and a lower housing (108), configured to carry at least one of a receiver and a transmitter. A speaker (342) has a front side acoustically coupled to a first air space in front of an ear placement region (120) of the upper housing (102). The speaker (342) has a rear side acoustically coupled to a second air space. At least a first passage acoustically couples the first air space to a third air space that is substantially separated from the second air space.

53 Claims, 15 Drawing Sheets

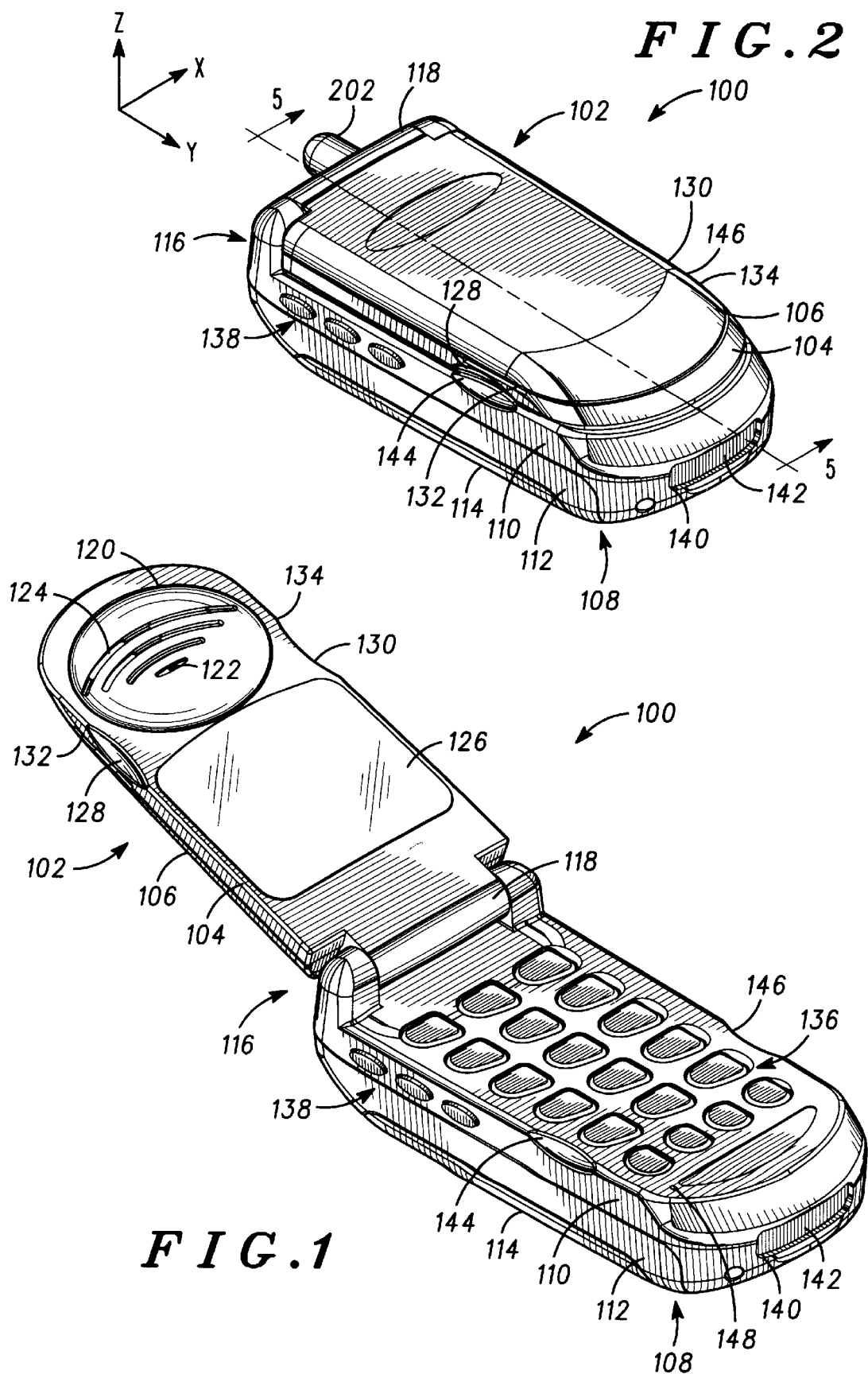

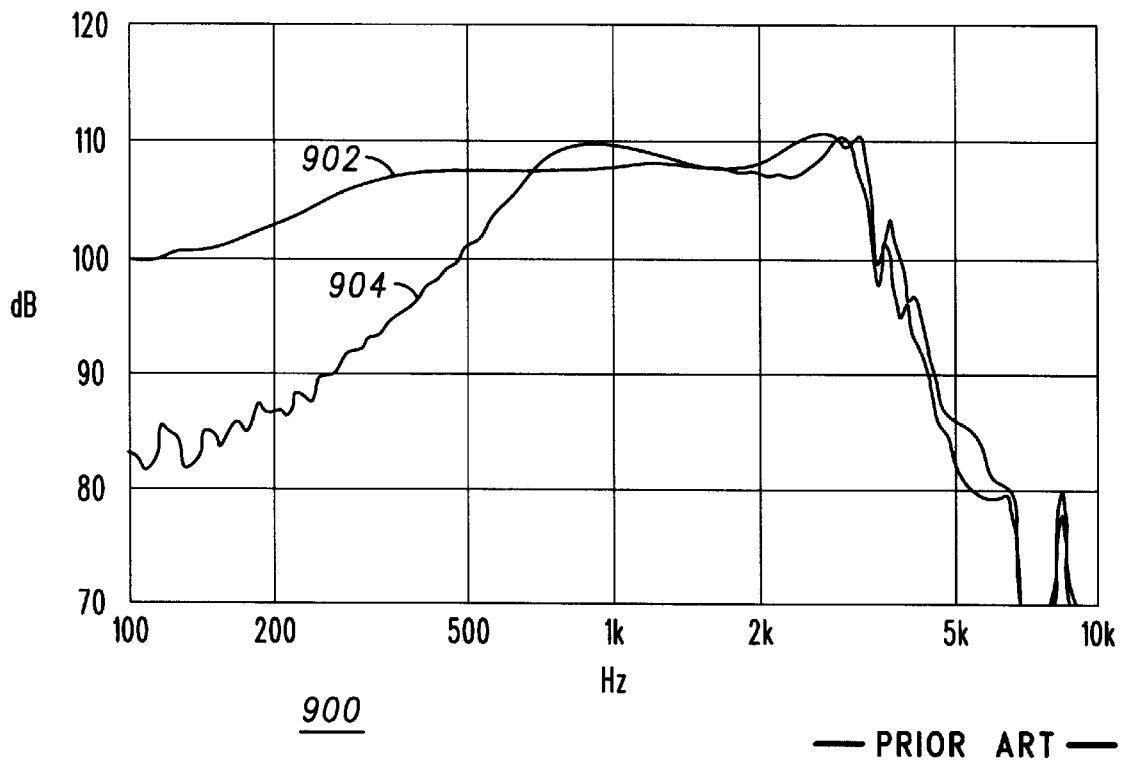
FIG. 9 — PRIOR ART —
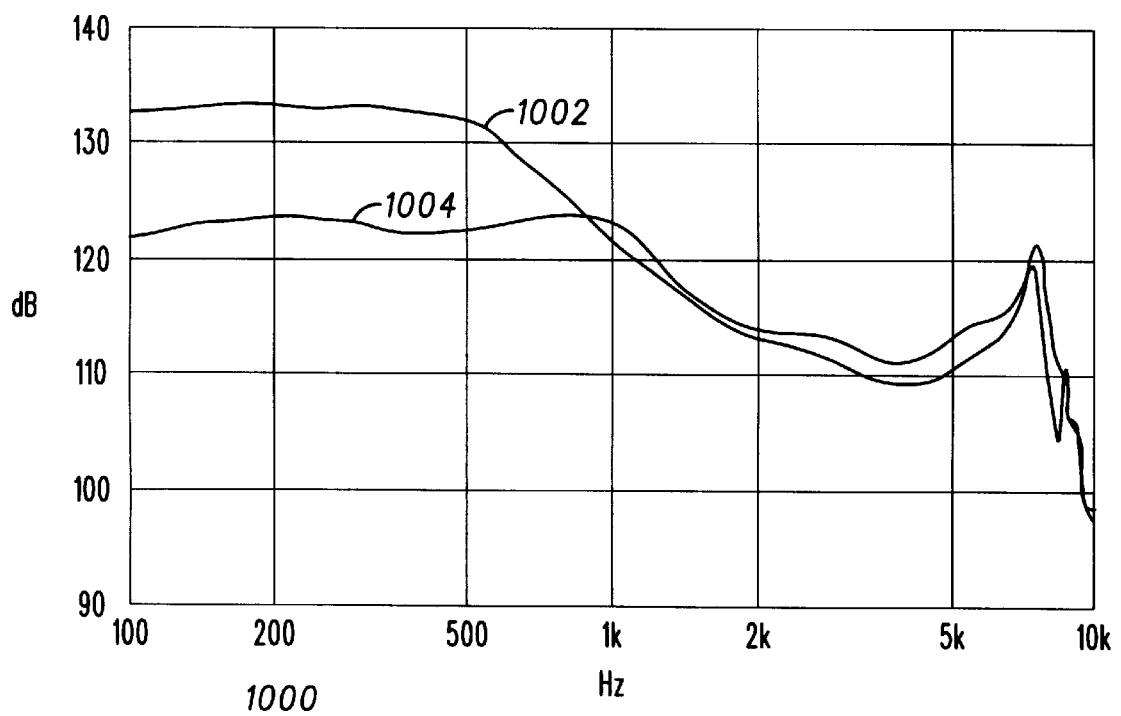
FIG. 10 — PRIOR ART —

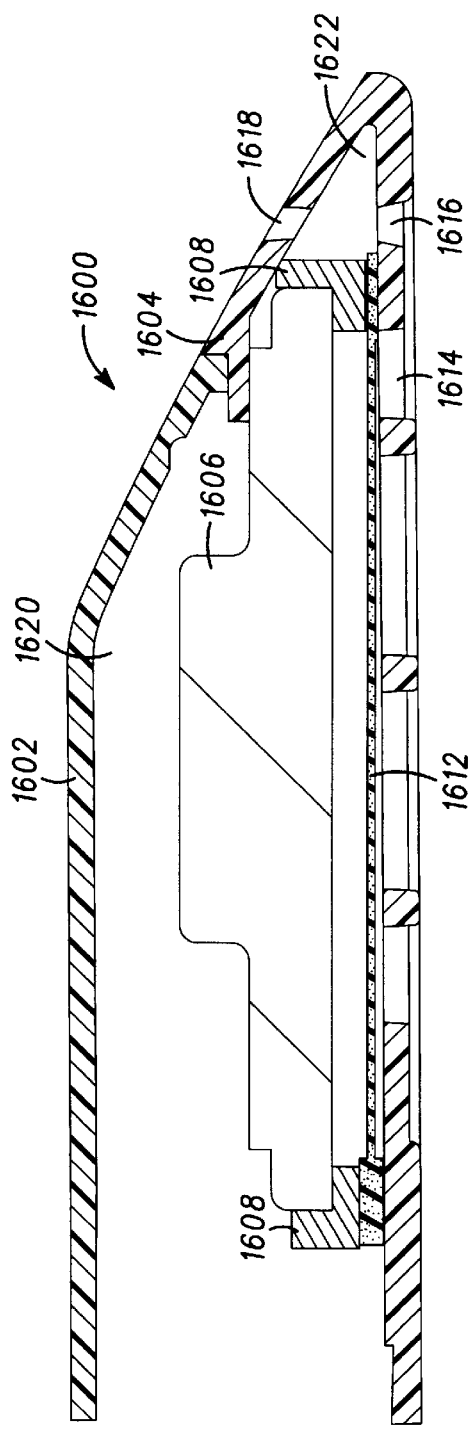
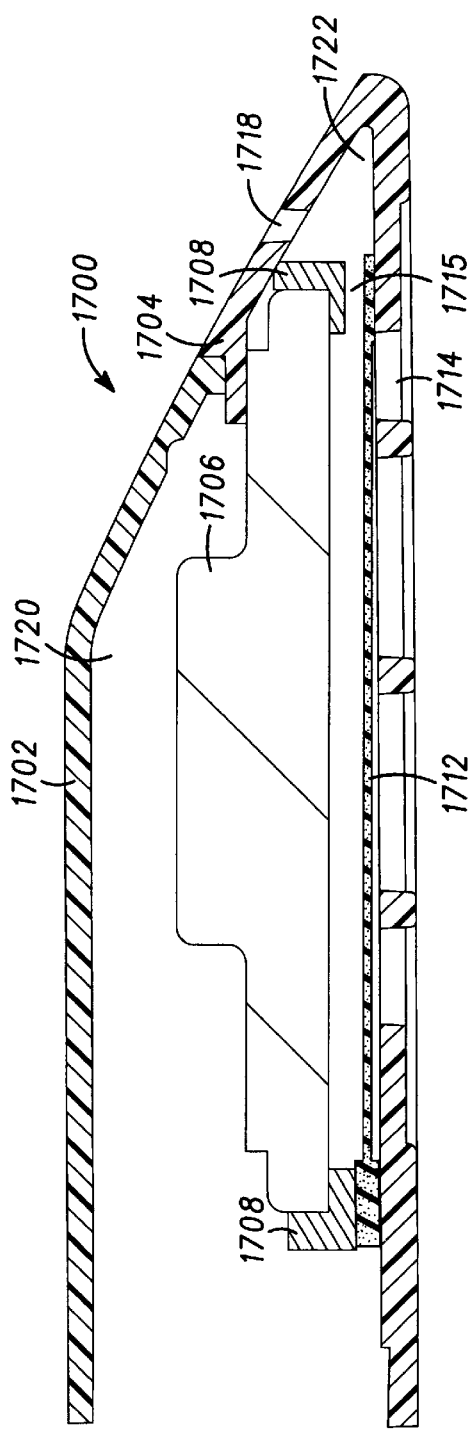

PORTABLE ELECTRONIC DEVICE WITH A SPEAKER ASSEMBLY

FIELD OF THE INVENTION

The present invention relates generally to the field of portable electronic devices with speaker assemblies.

BACKGROUND OF THE INVENTION

A handheld portable electronic device, such as a portable radiotelephone, employs a speaker to convert electrical signals into sound waves in the human-audible frequency range of 20 Hertz (Hz) to 20,000 kiloHz (kHz). The speaker enables a user of the radiotelephone to hear a representation of a caller's voice, as well as other sounds such as dial tones. The quality of the sound reproduction is an important factor in a customer's decision to buy a portable radiotelephone. Audio quality of a speaker is determined by its frequency response over the audible frequency range. Manufacturers of speakers normally provide a specified frequency response of a speaker when it is used in a "free-field" environment. Speakers employed in radiotelephones, however, are rarely used in a free-field environment. Instead, the user places the radiotelephone against his ear to hear the sound, and the speaker is positioned very close to the human ear.

The goal of an acoustic engineer in the radiotelephone field is to choose the combination of speaker, enclosure, and preconditioning electrical circuitry that provides an acceptable audio quality. An acceptable audio quality is usually a measure of how flat, or variable, the frequency response of the speaker is in its environment over the frequency range of 300 Hz to 4 kHz. The flatter, or less variation, of the frequency response, the better the audio quality. A frequency response that is higher, or boosted, in the low frequencies than in the high frequencies will sound bassy and muffled; whereas a frequency response that is higher in the high frequencies than in the low frequencies will sound shrill and tinny.

Two types of speaker technology are in predominate use for handheld radiotelephones—piezo-electric speakers and dynamic speakers—both of which have a high free air resonant frequency. Both speaker technologies are specified to work with an airtight seal between the speaker and the human ear. Achieving the airtight seal requires that the speaker have an airtight mount to the handheld radiotelephone housing and the radiotelephone housing have an airtight coupling where the housing meets the ear. The ear-housing coupling is achieved by forming a depression in the housing that conforms to the shape of the human ear. As long as the airtight seal is maintained, these types of speakers have been able to provide an acceptable frequency response.

As handheld radiotelephones become smaller in size, an airtight ear-housing coupling is difficult to achieve for all users because the housing is not large enough to form a depression in the housing surface that accommodates the size of all human ears. Consequently, for some users, an air leakage occurs between the housing and the human ear, resulting in a loss, or attenuation, of low frequency response. Tests on various speakers have shown that this loss can average 15 decibels (dB) at 300 Hz, resulting in a tinny sound.

To further illustrate, FIG. 9 shows a graph 900 of acoustic frequency response curves 902 and 904 from a conventional portable radiotelephone using a piezo-electric type speaker with a high free air fundamental resonant frequency. Each of acoustic frequency response curves 902 and 904 show an acoustic sound pressure level versus frequency. More specifically, acoustic frequency response curve 902 was obtained where an earcup of the conventional portable radiotelephone was sealed to an artificial ear (IEC-318 type, not shown). Acoustic frequency response curve 904 was obtained where the earcup was unsealed using a leakage ring adapter (not shown) in conjunction with the artificial ear. As acoustic frequency response curve 904 reveals, an undesirable bass loss is present in the unsealed condition.

A low-acoustic impedance dynamic speaker is designed to boost the frequency response at the low end of the frequency range, and can be used to remedy the bass loss caused by air leakage between the housing and the human ear. Such a speaker—when mounted with an airtight seal between the speaker and the housing—however, exhibits excessive low frequency gain when an airtight seal is formed between the housing and the human ear. Consequently, the sound is bassy and muffled. Furthermore, there is a large variation of about 11 dB between the highest and lowest point in the frequency response, thus the audio quality is poor.

To further illustrate, FIG. 10 shows a graph 1000 of acoustic frequency response curves 1002 and 1004 from a conventional portable radiotelephone using a dynamic type speaker with a low free air fundamental resonant frequency. Each of acoustic frequency response curves 1002 and 1004 show an acoustic sound pressure level versus frequency. More specifically, acoustic frequency response curve 1002 was obtained where an earcup of the conventional portable radiotelephone was sealed to the artificial ear. Acoustic frequency response curve 1004 was obtained where the earcup was unsealed using the leakage ring adapter in conjunction with the artificial ear. As acoustic frequency response curve 1002 reveals, an undesirable bass boost is present in the sealed condition.

The size of the smaller handheld radiotelephones not only affects the seal between the housing and the human ear but also the size of the enclosure housing the speaker. Smaller handheld radiotelephones have less space to house the enclosure, and the size of the enclosure affects the frequency response of the speaker.

A need therefore exists for a speaker assembly for small handheld radiotelephones, which has limited space for enclosing the speaker and limited size for providing an airtight seal with the human ear, that provides acceptable audio-quality.

BRIEF DESCRIPTION OF THE DRAWINGS

FIG. 1 is a perspective view of a portable radiotelephone in an open position.

FIG. 2 is a perspective view of the portable radiotelephone in a closed position.

FIG. 9 is a graph showing acoustic frequency responses of a conventional portable radiotelephone in sealed and unsealed conditions, using a piezo-electric speaker with a high free air fundamental resonant frequency.

FIG. 10 is a graph showing acoustic frequency responses of another conventional portable radiotelephone in sealed and unsealed conditions, using a dynamic type speaker with a low free air fundamental resonant frequency.

FIG. 16 is a cross sectional view of a portion of a portable radiotelephone with a speaker assembly in a second alternate embodiment.

FIG. 17 is a cross sectional view of a portion of a portable radiotelephone with a speaker assembly in a third alternate embodiment.

DETAILED DESCRIPTION OF THE PREFERRED EMBODIMENTS

Figure 3:
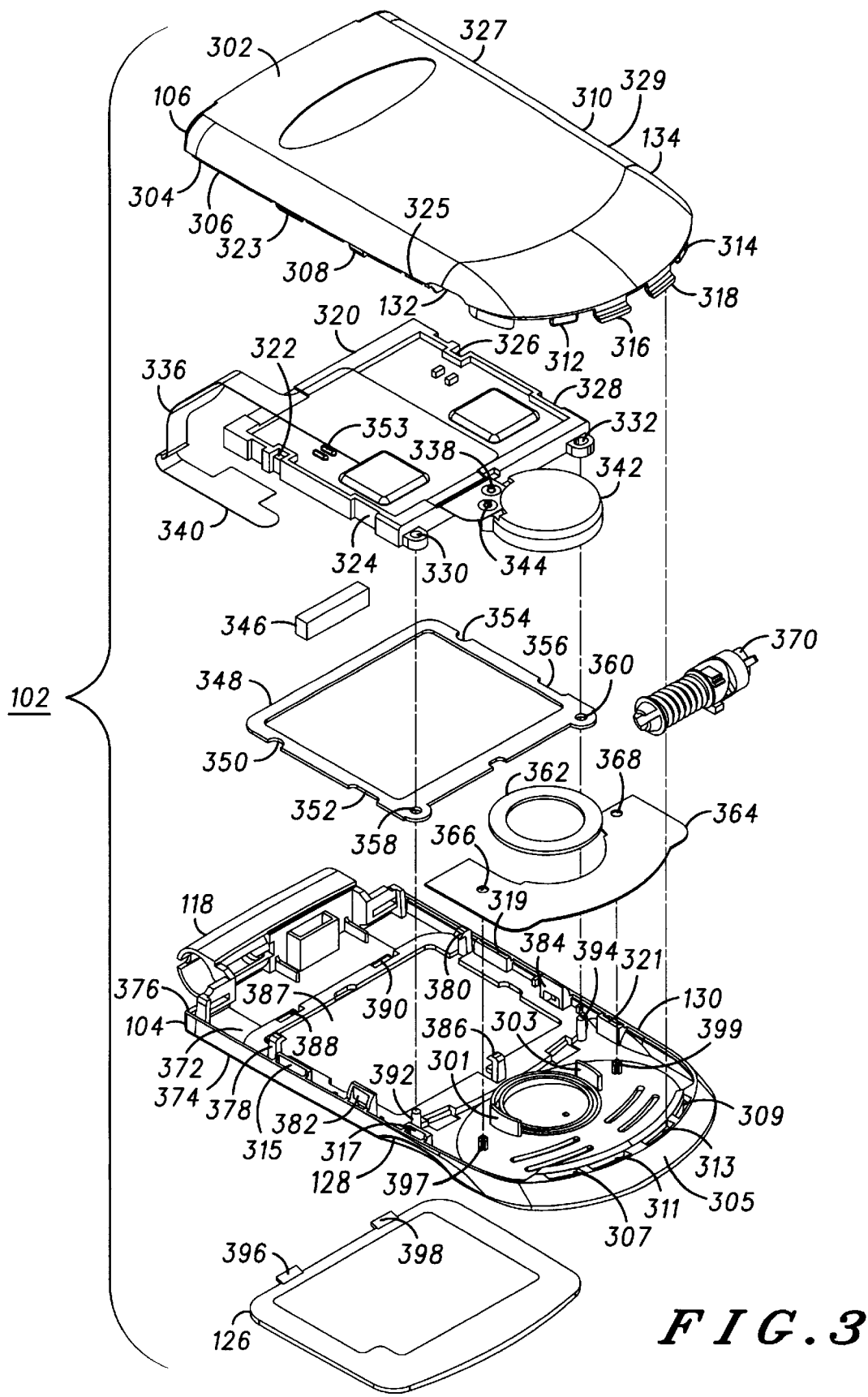
FIG. 3 is a rear, top, left side exploded view of an upper housing of the portable radiotelephone.

A portable electronic device, such as a portable radiotelephone, with a speaker assembly is described. A housing is configured to carry at least one of a receiver and a transmitter. A speaker has a front side acoustically coupled to a first air space in front of an ear placement region of the housing. The speaker has a rear side acoustically coupled to a second air space. At least a first passage acoustically couples the first air space to a third air space that is substantially separated from the second air space.

FIG. 1 shows a perspective view of a portable radiotelephone 100. Portable radiotelephone 100 is a portable electronic device and, more particularly, a portable electronic device that provides for wireless communication via radio frequency (RF) signals. Portable radiotelephone 100 may be operable in cellular telephone systems and is commonly referred to as a portable cellular telephone.

Portable radiotelephone 100 has an upper housing 102 and a lower housing 108 rotatably connected via a hinge 116. Portable radiotelephone 100 has a open position, as shown in FIG. 1, and a closed position, as shown in FIG. 2. Orientation axes are also shown in FIG. 2. With such a configuration, portable radiotelephone 100 is commonly referred to as a foldable or clamshell style telephone. Upper and lower housings 102 and 108 form a housing of portable radiotelephone 100. The housing has a receiver and a transmitter (not shown) disposed therein (here, in lower housing 108) for providing RF communication.

Upper housing 102 is formed by front housing portion 104 and a rear housing portion 106. Front housing portion 104 forms a barrel 118 of hinge 116. A display lens 126 is carried on upper housing 102 and is substantially flush with a front surface thereof. A finger recess 128 (optional) is formed along the front and a left side surface of upper housing 102, and a finger recess 130 (optional) is formed along the front and a right side surface of upper housing 102. Upper housing 102 also has an ear placement region 120 on the front surface, where an ear of a user is positioned for listening to voice signals from a speaker (not visible in FIGS. 1 and 2). An opening 122 is formed on the front surface and positioned within ear placement region 120. A plurality of additional openings, such as an opening 124, are formed on the front surface within ear placement region 120. (Here, the number of the plurality of additional openings or slots is four.) Also, an opening 132 is formed on the left side surface and an opening 134 is formed on the right side surface. Openings 132 and 134 may be referred to as slots in upper housing 102.

Similar to upper housing 102, lower housing 108 is formed by a front housing portion 110 and a rear housing portion 112. A plurality of input keys 136, including conventional telephone keys (0–9, *, and #) and function keys, are exposed on a front surface of lower housing 108. In addition, a plurality of input keys 138 are exposed on a left side surface of lower housing 108. An antenna 202 (FIG. 2) is positioned at a top surface of lower housing 108. An opening 140 is formed on a bottom surface of lower housing 108 and exposes an electrical connector 142. A detachable battery cover 114 is detachably carried on a bottom surface of lower housing 108 and covers a battery (not shown in FIGS. 1 and 2). An opening 148 is formed on the front surface, where a mouth of a user is positioned for talking into a microphone (not visible in FIGS. 1 and 2). A finger recess 144 is formed along the front and the left side surface, and a finger recess 146 is formed along the front and a right side surface of lower housing 108.

Upper and lower housings 102 and 108 form a housing that is very small in size, and preferably sized for handheld usage and clothing pocket portability. For example, in this embodiment, the housing has dimensions of approximately 83 mm in length, 42 mm in width, and 26 mm in depth (in the closed position, FIG. 2). Upper and lower housings 102 and 108 are made from a durable and somewhat flexible material, such as a polycarbonate.

Figure 4:
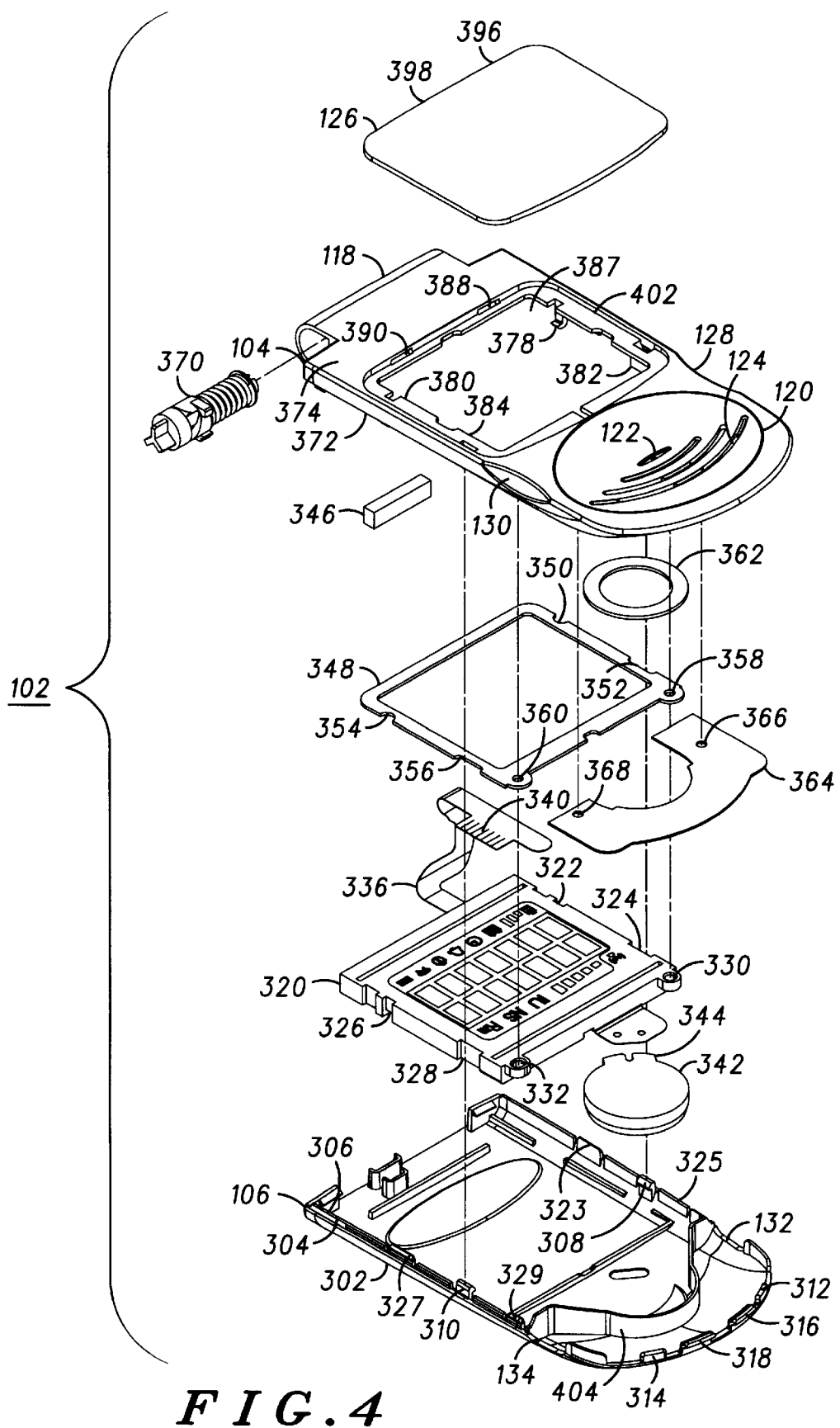
FIG. 4 is a front, top, right side exploded view of the upper housing.

FIGS. 3 and 4 show a top perspective exploded view and a bottom perspective exploded view, respectively, of upper housing 102. FIGS. 3 and 4 will be referred to in combination in the description that follows. Upper housing 102 includes front housing portion 104 and rear housing portion 106, as well as a visual display assembly 320, a flexible connector 336, a speaker 342, a magnet 346, a display gasket 348, a speaker gasket 362, a felt 364, a hinge assembly 370, and display lens 126.

A speaker assembly is included in upper housing 102. In this embodiment, speaker 342 is a typical telephone earpiece speaker, which includes a speaker diaphragm (not visible) attached to a speaker basket (see FIG. 6), and a diaphragm cover (not visible) attached to the speaker basket to cover the speaker diaphragm. Speaker 342 has a plurality of openings on a front side through the diaphragm cover, and also has a plurality of openings on a rear side through the speaker basket (see FIG. 6). Some of these typical telephone earpiece speakers do not have diaphragm covers, and some do not have openings on speaker baskets.

Details on how upper housing 102 is constructed to form the speaker assembly is described. Rear housing portion 106 forms a housing shell having an outside surface 302, an inside surface 304, and a mating perimeter 306 along a top of walls of the housing shell. Tabs 327 and 329 are formed generally along and within boundaries of a portion of mating perimeter 306 on a left side of rear housing portion 106. Likewise, tabs 323 and 325 are formed generally along and within boundaries of a portion of mating perimeter 306 on a right side of rear housing portion 106.

Tabs 312 and 314 and L-shaped tabs 316 and 318 are formed along a portion of mating perimeter 306 on a top end of rear housing portion 106. L-shaped tabs 308 and 310 are formed along a portion of mating perimeter 306 on the left and right sides, respectively. A wall 404 (FIG. 4) is formed on rear housing portion 106 and generally extends outward from inside surface 304 in the configuration shown.

Flexible connector 336, which is indeed flexible, includes conductive pads 340 electrically coupled to conductive pads 353 and 338 (positioned thereon) through electrical conductors (not visible). Visual display assembly 320 has a housing provided with tracks 322 and 324 along a left side thereof, tracks 326 and 328 along a right side thereof, and holes 330 and 332 along a top end thereof. Tracks 322 and 326 have catches formed thereon, whereas tracks 324 and 328 do not. Conductive pads 334 are provided on a surface of visual display assembly 320 and are coupled to display circuitry through electrical conductors (not visible).

Front housing portion 104 forms a housing shell having an inside surface 372, an outside surface 374, and a mating perimeter 376 along a top of walls of the housing shell. An L-shaped tab 378 is formed on a left side of rear housing portion 106 near and within boundaries of mating perimeter 376. Similarly, an L-shaped tab 380 is formed on a right side of rear housing portion 106 near and within boundaries of mating perimeter 376. Catches 382 and 384 are also formed on the left and the right sides, respectively, near and within boundaries of mating perimeter 376. Catches 382 and 384 generally extend outward from inside surface 372, and each form an opening near inside surface 372. Slots 315 and 317 are formed on the left side near and within boundaries of mating perimeter 376. Likewise, slots 319 and 321 are formed on the right side near and within boundaries of mating perimeter 376.

Openings 122 and 124 are formed on front housing portion 104 and located within ear placement region 120 (FIG. 4). A display window 387 is formed within boundaries of mating perimeter 376. Slits 388 and 390 are formed on front housing portion 104 adjacent to display window 387. Pins 392 and 394, pins 397 and 399, and walls 301 and 303, generally extend outward from inside surface 304.

The top end of front housing portion 104 forms a wall 305, which generally extends from inside surface 372 inward toward a bottom end of front housing portion 104. Slots 307 and 309, and slots 311 and 313, are formed through wall 305 into a cavity formed between wall 305 and inside surface 372.

Display gasket 348 forms a central opening surrounded by notches 350 and 352 and a hole 358 on a left side thereof and by notches 354 and 356 and a hole 360 of a right side thereof. Felt 364 has holes 366 and 368 on left and right sides, respectively. Display lens 126 forms tabs 396 and 398 on a bottom end.

Upper housing 102 may be assembled as follows. Flexible connector 336 is disposed on a surface of visual display assembly 320, where conductive pads 353 are soldered to conductive pads 334, providing an electrical path between visual display assembly 320 and some of conductive pads 340. Similarly, conductive pads 344 of speaker 342 are soldered to conductive pads 338 of flexible connector 336, providing an electrical path between speaker 342 and some of conductive pads 340. Some of conductive pads 340 are later coupled to audio circuitry (not shown) disposed in lower housing 108.

Display lens 126 is positioned and adhesively attached around a mating perimeter 402 (FIG. 4) of front housing portion 104, where tabs 396 and 398 insert within slits 388 and 390, respectively. Magnet 346 is positioned on inside surface 372 (FIG. 3), and eventually secured in place by other elements. Felt 364 is positioned on inside surface 372 so that pins 397 and 399 insert through holes 366 and 368, respectively. Hinge assembly 370 is loaded within barrel 118.

Display gasket 348 is adhesively attached to inside surface 372 around display window 387, where pins 392 and 394 insert through holes 358 and 360, respectively. Visual display assembly 320 is positioned over display window 387 and onto display gasket 348, where catches 382 and 384 slide along tracks 324 and 328, respectively, L-shaped tabs 378 and 380 bend outwardly and slide along tracks 322 and 326, respectively, until locked with the catches of tracks 322 and 326, and pins 392 and 394 insert through holes 330 and 332. An adhesive seal is formed between visual display assembly 320 and display gasket 348. Thus, visual display assembly 320 is secured to front housing portion 104 and adhesively attached to inside surface 372 around display window 387.

Figure 6:
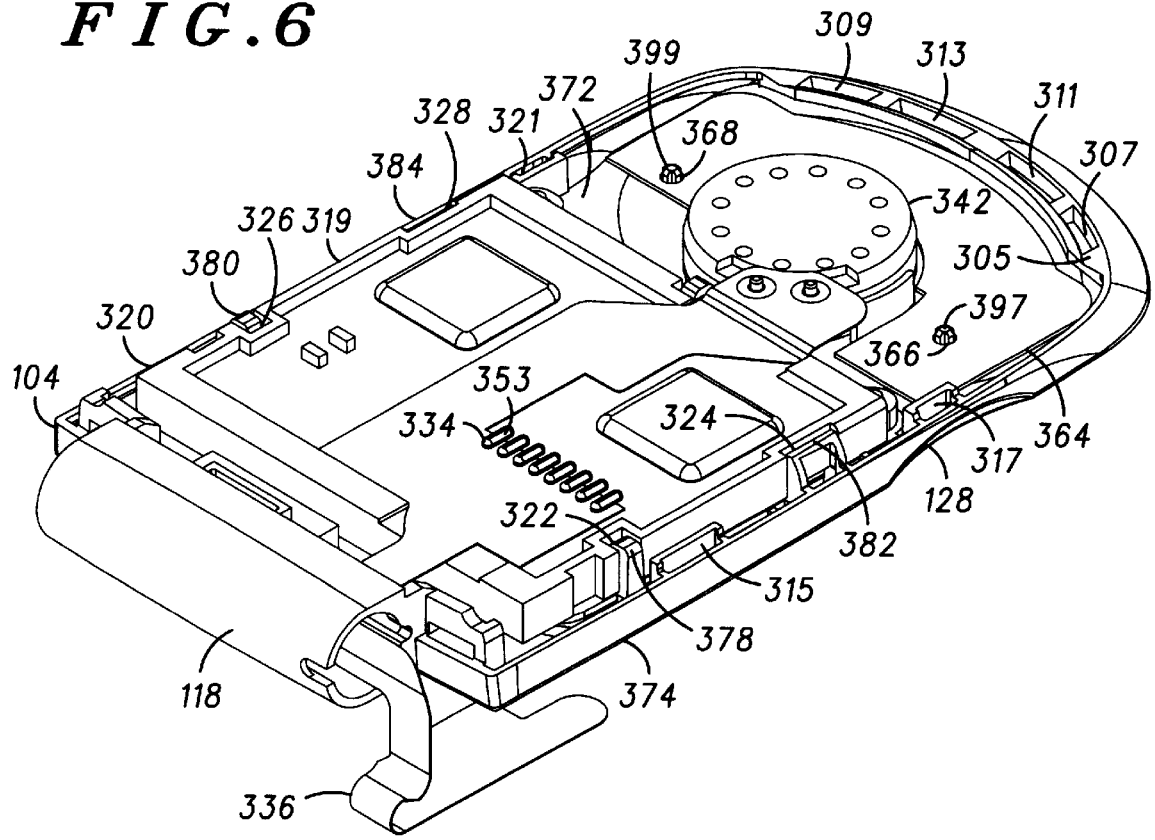
FIG. 6 is a perspective view of a partial assembly of the upper housing.

Together with visual display assembly 320, speaker 342 is positioned on inside surface 372 (on circular ribs 802 and 804, see FIGS. 7 and 8) between walls 301 and 303, which partially encircle speaker 342. Before this, speaker gasket 362 is adhesively attached to a front outside edge of speaker 342. Thus, a front side of speaker 342 faces and is enclosed around inside surface 372 and opening 122. Speaker gasket 362 forms an adhesive seal between speaker 342 and inside surface 372. An end of flexible connector 336 is inserted through an opening in barrel 118. FIG. 6 shows a perspective view of upper housing 102 as partially assembled.

Next, the front end of rear housing portion 106 is positioned toward the front end of front housing portion 104 such that tabs 312 and 314 insert through slots 307 and 309, respectively, and L-shaped tabs 316 and 318 insert through slots 311 and 313, respectively. The bottom end of rear housing portion 106 is tilted toward the bottom end of front housing portion 104 until L-shaped tabs 308 and 310 bend outwardly and slide along catches 382 and 384, respectively, until captured within the openings of catches 382 and 384. Tabs 323 and 325 insert through slots 315 and 317, respectively, and tabs 327 and 329 insert through slots 319 and 321, respectively. Thus, front and rear housing portions 104 and 106 are brought together to form upper housing 102, where mating perimeters 306 and 376 are mated.

Figure 5:
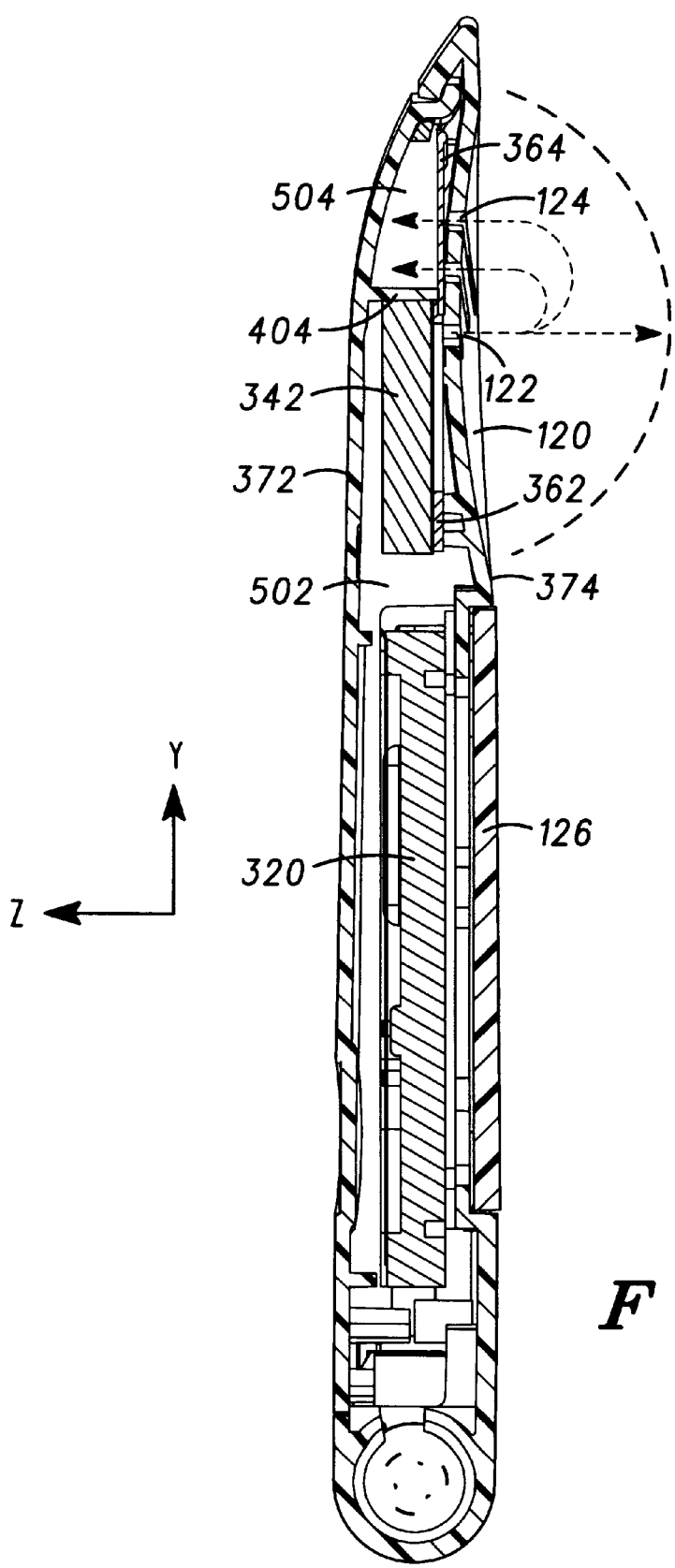
FIG. 5 is a cross sectional view of the upper housing taken along a line 5—5' of FIG. 1.

FIG. 5 is a cross-section view of upper housing 102 taken along a line 5—5' of FIG. 1. FIG. 5 shows an internal cavity 502 formed in upper housing 102, which is substantially separated from an internal cavity 504 formed in upper housing 102. Internal cavities 502 and 504 may be referred to as air spaces formed in upper housing 102. As shown, internal cavity 502 is substantially formed by front and rear housing portions 104 and 106, wall 404, visual display assembly 320, display gasket 348, and display lens 126. Internal cavity 504 is substantially formed by front and rear housing portions 104 and 106, and wall 404.

Figure 7:
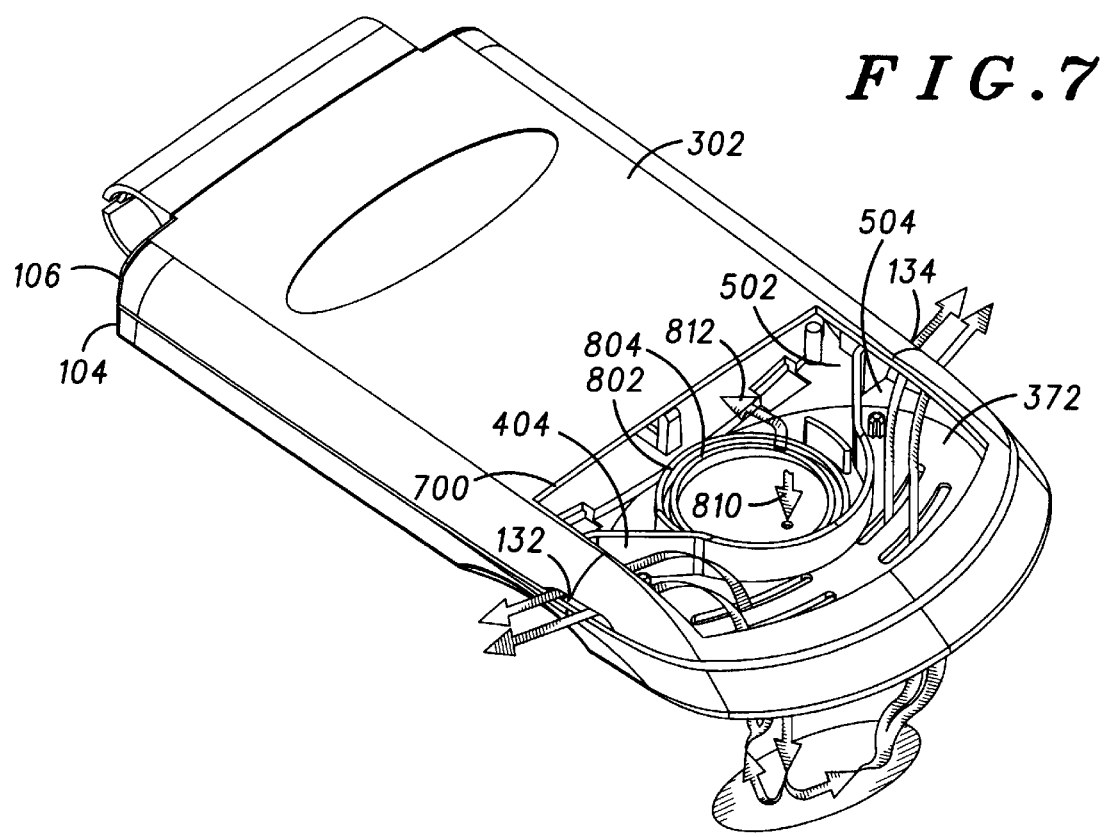
FIG. 7 is a perspective view of a partial assembly of the upper housing with a cutaway.
Figure 8:
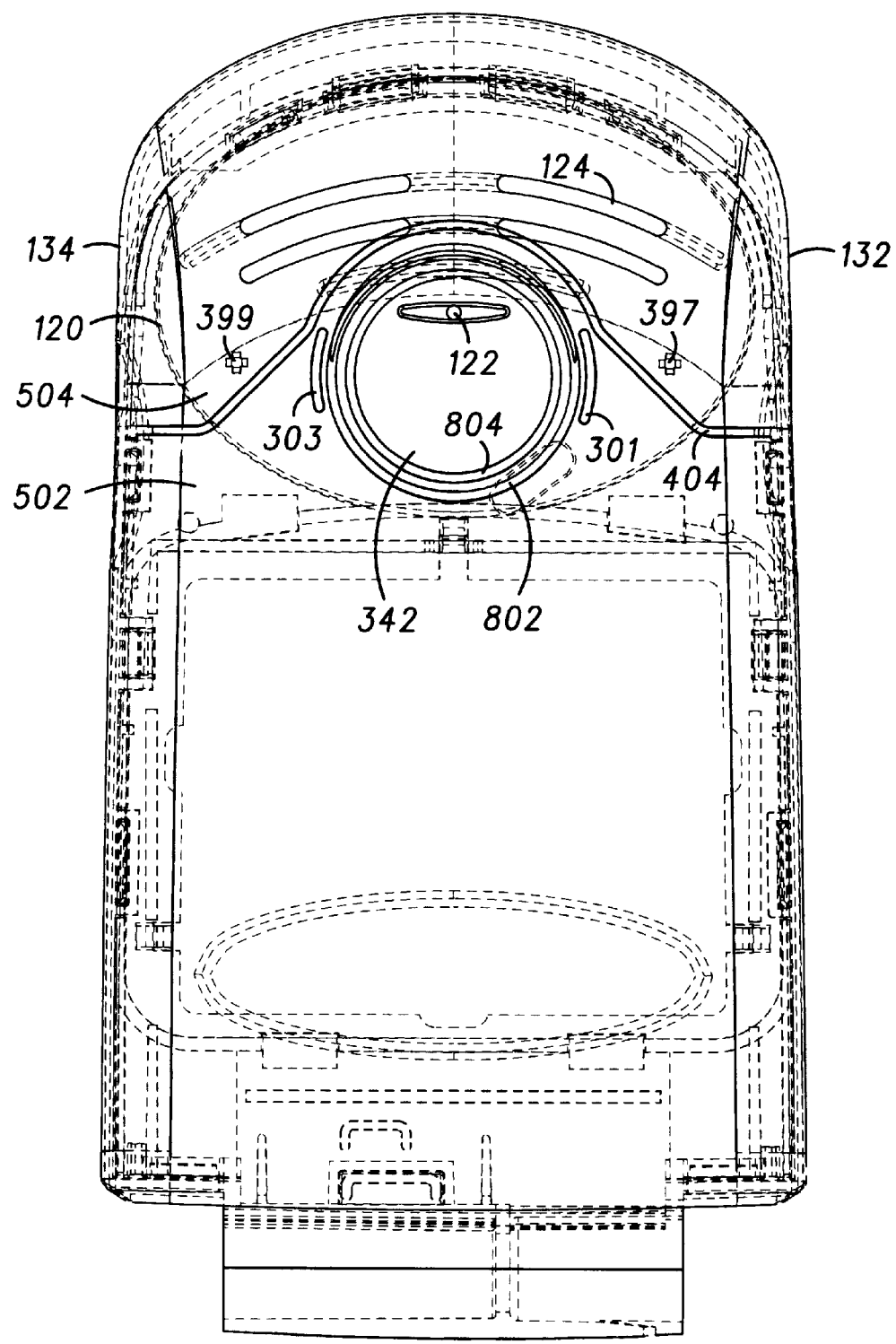
FIG. 8 is a plan view of the upper housing.

FIG. 7 shows a perspective view of front and rear housing portions 104 and 106 assembled (without other components for clarity) and a cutaway 700 on a portion of outside surface 302. FIG. 8 is a plan view of upper housing 102, showing more particularly wall 404 that helps substantially separate upper housing 102 into internal cavities 502 and 504.

Referring to FIGS. 5, 7 and 8 in combination, opening 122 positioned within ear placement region 120 leads to a front side of speaker 342 through a passage. More particularly, opening 122 leads to a front side of the speaker diaphragm of speaker 342 through the passage (and through the diaphragm cover of speaker 342). Thus, sound pressure waves from the front side of speaker 342 and the speaker diaphragm are acoustically coupled to an air space (a first air space) formed in front of ear placement region 120 through the passage having opening 122. A rear side of speaker 342 has openings formed on a basket (see FIG. 6) which carries the speaker diaphragm. Sound pressure waves from a rear side of speaker 342 and the speaker diaphragm are acoustically coupled to internal cavity 502 (a second air space) through the openings of the speaker basket.

Opening 124, which is also positioned within ear placement region 120, leads to internal cavity 504 through a passage. (The other plurality of additional openings lead to internal cavity 504 as well.) Thus, the air space in front of ear placement region 120 is acoustically coupled to internal cavity 504 (a third air space) through the passage having opening 124. Openings 132 and 134, which are positioned outside of ear placement region 120, lead to internal cavity 504 through passages as well. Thus, internal cavity 504 is acoustically coupled to open air (a fourth air space), an air space away from ear placement region 120.

During use of portable radiotelephone 100, an ear volume (e.g., designated by dashed lines in FIG. 5) is formed between ear placement region 120 and a human ear. The ear volume, which may be formed by a completely or partially enclosed seal, includes the air space formed in front of ear placement region 120. Here, sound pressure waves from the front side of speaker 342 are acoustically coupled to the ear volume through the passage having opening 122. The ear volume is also acoustically coupled to internal cavity 504 through the passages having the plurality of additional openings (e.g., opening 124).

Referring more specifically to FIG. 7, a sound pressure wave flow 810 is representative of sound pressure wave flow from the front side of the speaker diaphragm when audio signals are generated and the ear volume is formed between ear placement region 120 and the ear of a user. As shown by sound pressure wave flow 810, sound pressure waves are directed through a passage and out of opening 122 where it reaches the ear volume (a first air space in front of ear placement region 120)). Some of the sound pressure waves enter into the ear of the user. Some of the sound pressure waves are forced into the plurality of additional openings (e.g., opening 124) and through passages (and also through felt 364, not shown in FIG. 7) into internal cavity 504. The sound pressure waves are then forced through openings 132 and 134 and outside of upper housing 102 to open air.

A sound pressure wave flow 812 is representative of sound pressure wave flow from a rear side of speaker 342 when audio is present. As shown by sound pressure wave flow 812, sound pressure waves are directed from the rear side of the speaker diaphragm into internal cavity 502. Internal cavity 502 is sized large enough so as to not substantially affect the compliance of the speaker diaphragm suspension.

Figure 11:
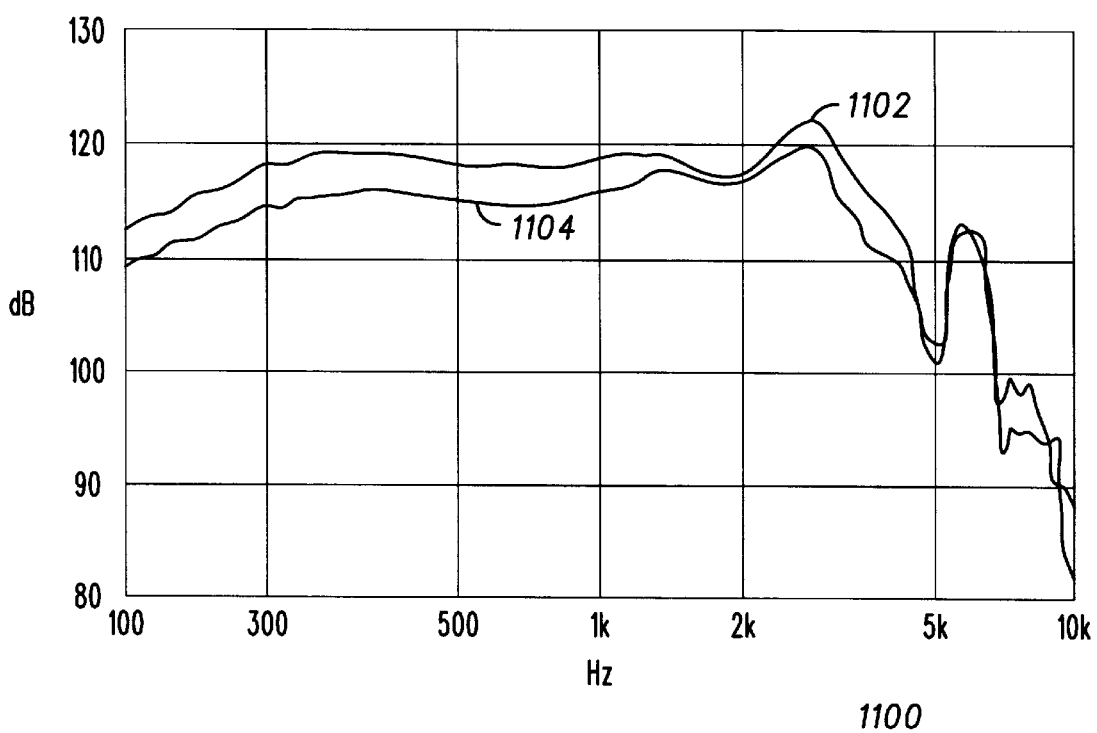
FIG. 11 is a graph showing acoustic frequency responses of the portable radiotelephone of FIGS. 1–8 in sealed and unsealed conditions.

FIG. 11 shows a graph 1100 of acoustic frequency response curves 1102 and 1104 of portable radiotelephone 100. Graph 1100 was obtained using methods similar those described in relation to FIGS. 9 and 10. More specifically, acoustic frequency response curve 1102 was obtained where ear placement region 120 was sealed to the artificial ear, and acoustic frequency response curve 1104 was obtained where ear placement region 120 was unsealed using the leakage ring adapter. As acoustic frequency response curves 1102 and 1104 reveal, no substantial bass loss or boost occurs in the sealed condition using portable radiotelephone 100. Acoustic frequency response curve 1102 is substantially the same as acoustic frequency response curve 1104. Portable radiotelephone 100 provides an acoustic frequency response that is substantially independent of a seal around ear placement region 120. (These results should be compared with the results shown in FIGS. 9 and 10, which were obtained with conventional portable radiotelephones as described earlier above.)

In general, the desired frequency response (here, acoustic frequency response curve 1102) was achieved by tuning the ear volume—which was done here by acoustically coupling the ear volume to an internal cavity, which was coupled to open air.

The size and the number of openings (e.g., the plurality of additional openings, such as opening 124, and openings 132 and 134), in combination with the length of any passages of these openings, in combination with the volume of an internal cavity (i.e., internal cavity 504), were chosen to achieve the desired frequency response (here, acoustic frequency response curve 1102). It is understood that the number and the size of these openings may be chosen in combination with felts, screens, meshes, or other suitable materials that acoustically resist air flow to achieve a desired frequency response. In addition, the size and the number of openings leading to a front side of speaker 342 (e.g., opening 122), in combination with the lengths of any passages of these openings, may be chosen in combination with felts, screens, meshes, or other suitable materials (e.g., felt 364) that acoustically resist air flow to achieve a desired response. Furthermore, the sizes and numbers of the openings on the rear side of the speaker basket may be chosen in combination with the volume of an internal cavity (i.e., internal cavity 502) for the purpose of optimizing the suspension compliance of the speaker diaphragm. This combination will also optimize the low frequency performance of speaker 342. In any of the above described arrangements, felts, meshes, screens, or other suitable materials may be disposed in any passages and/or internal cavities, disposed on inside or outside housing surfaces, on the front or back sides of a speaker, to resist air flow through any openings.

Figure 12:
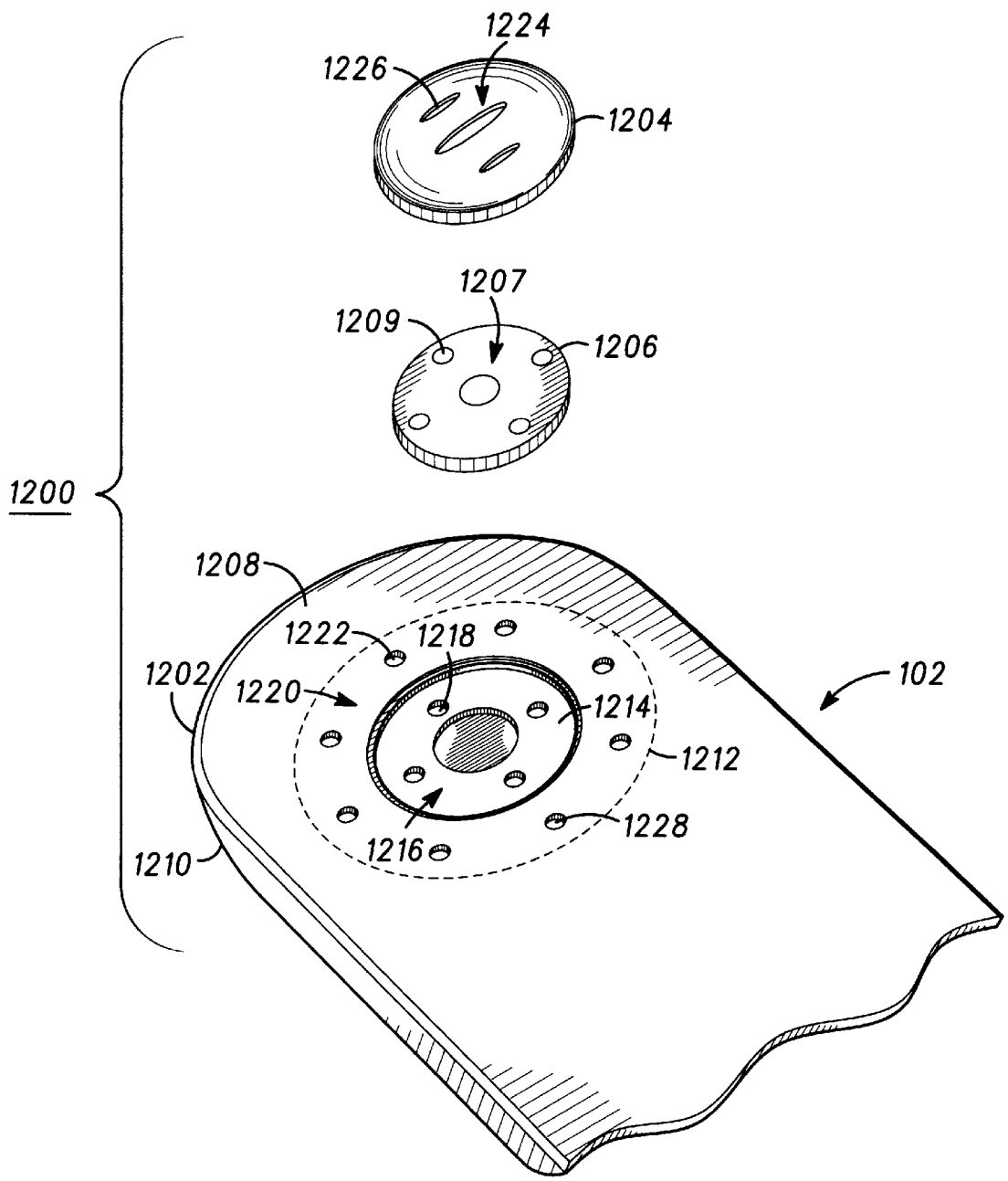
FIG. 12 is an exploded view of a portion of a portable radiotelephone with a speaker assembly in a first alternate embodiment.

FIG. 12 is an exploded view of a portion of a portable radiotelephone with a speaker assembly 1200 in a first alternate embodiment. Speaker assembly 1200 includes a housing portion 1202, a housing portion 1204, and a speaker 1206. Housing 35 portion 1202 forms a front surface 1208 and a rear surface 1210. Front surface 1208 has an ear placement region 1212 for an ear of a user to place for audio listening. Front surface 1208 also forms a recess 1214. A plurality of openings 1216, such as an opening 1218, are positioned in recess 1214. A plurality of openings 1220, such as an opening 1222 and an opening 1228, are positioned outside of recess 1214 but within ear placement region 1212. Speaker 1206 may be a telephone earpiece speaker, which will typically include a speaker diaphragm and a magnetic motor assembly housed in a basket (not shown in FIG. 12). Alternatively, speaker 1206 may be a piezo-electric speaker.

For assembly of speaker assembly 1200, speaker 1206 is disposed within recess 1214 and coupled to electrical conductors (not shown), which are coupled to audio circuitry (not shown) of the portable radiotelephone. Housing portion 1204 is positioned around speaker 1206 and within recess 1214, preferably with a snug fit for attachment, so that a front surface of housing portion 1204 is substantially flush with front surface 1208.

Figure 13:
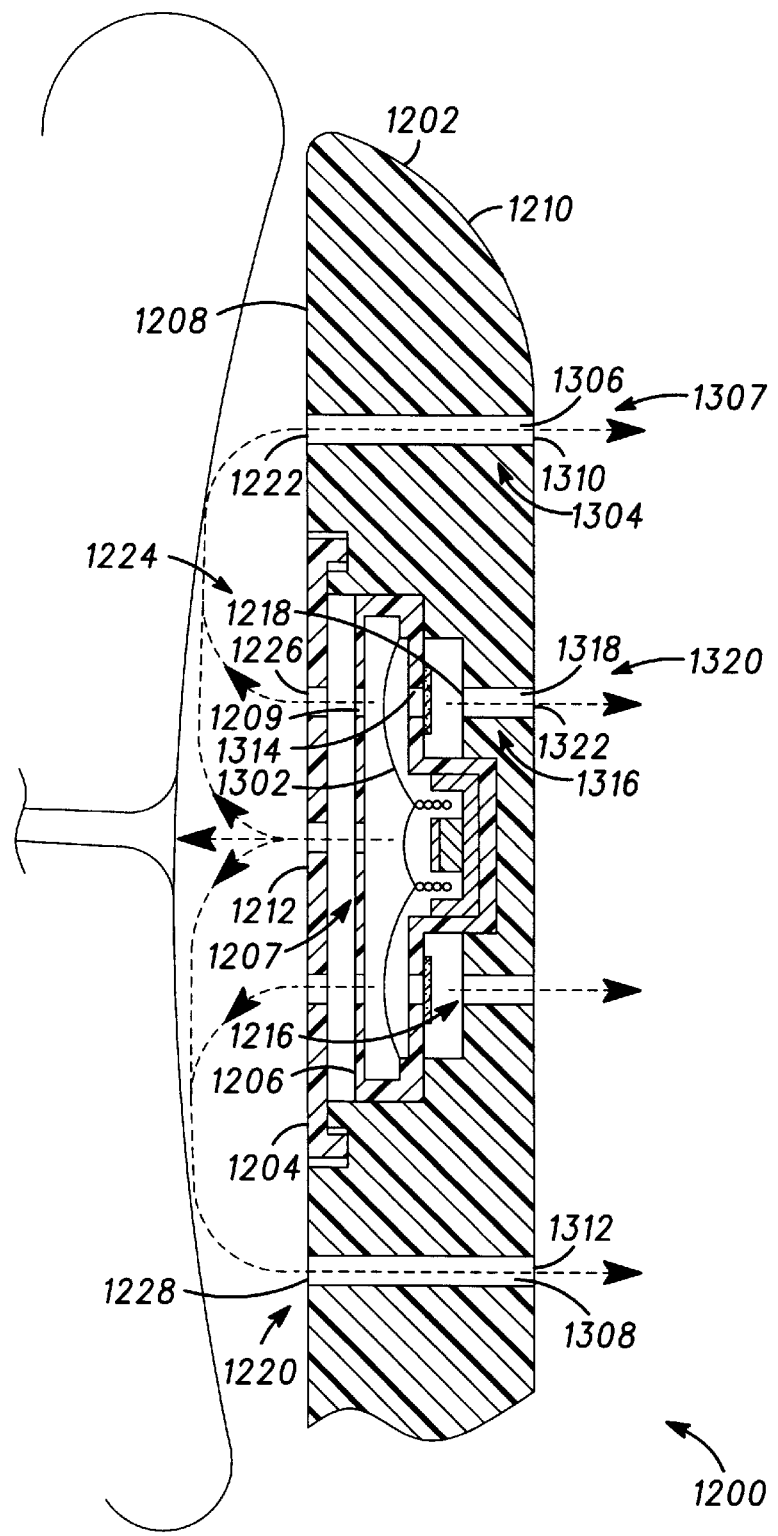
FIG. 13 is a cross sectional view of the portion of the portable radiotelephone of FIG. 12.

FIG. 13 is a cross sectional view of the portion of the portable radiotelephone of FIG. 12 when assembled. As shown, the plurality of openings 1224 lead to a front side of speaker 1206, and the plurality of openings 1207 lead to a front side of a speaker diaphragm 1302 of speaker 1206. Thus, sound pressure waves from the front side of speaker 1206 and speaker diaphragm 1302 are acoustically coupled to an air space (a first air space) in front of ear placement region 1212.

The plurality of openings 1216 lead to a plurality of passages 1316 formed in housing portion 1202. The plurality of passages 1316 have a plurality of openings 1320 positioned outside of ear placement region 1212. For example, opening 1218 leads to a passage 1318 having an opening 1322. In this embodiment, the plurality of openings 1320 are positioned on rear surface 1210. The plurality of openings 1320 lead to a rear side of speaker 1206 through the plurality of passages 1316. Since the basket of speaker 1206 includes openings such as an opening 1314, the plurality of openings 1320 also lead to a rear side of speaker diaphragm 1302 as well. Thus, sound pressure waves from the rear side of speaker 1206 and speaker diaphragm 1302 are acoustically coupled to an air space (a second air space) away from ear placement region 1212. In this embodiment, the air space comprises open air as shown.

The plurality of openings 1220 lead to a plurality of passages 1304 formed in housing portion 1202. The plurality of passages 1304 have a plurality of openings 1307 positioned outside of ear placement region 1212. For example, opening 1222 leads to a passage 1306 having an opening 1310, and opening 1228 leads to a passage 1308 having an opening 1312. In this embodiment, the plurality of openings 1307 are positioned on rear surface 1210. Thus, when an ear volume is formed in front of ear placement region 1212, the air space in front of ear placement region 1212 is acoustically coupled to an air space (a third air space) away from ear placement region 1212. In this embodiment, the air space comprises open air as shown.

Sound pressure wave flow, assuming an ear volume is formed, is represented by dashed arrows of FIG. 13. Sound pressure waves from the front side of speaker diaphragm 1302 are generated by speaker 1206. The sound pressure waves travel through the plurality of openings 1207 (such as opening 1209) of speaker 1206 and through the plurality of openings 1224 (such as opening 1226) of housing portion 1204, reaching the air space in front of ear placement region 1212. Some of the sound pressure waves travel into the ear of the user. Some of the sound pressure waves are forced through the plurality of openings 1220 (such as openings 1222 and 1228) and into the plurality of passages 1304 (such as passages 1306 and 1308). The sound pressure waves exit through the plurality of openings 1307 (such as openings 1310 and 1312) to open air.

Sound pressure waves from the rear side of speaker diaphragm 1302 exit the openings (such as opening 1314) of speaker 1206 and travel through a small volume (optional) formed in housing portion 1202 and through the plurality of passages 1316 (such as passages 1318). The sound pressure waves exit through the plurality of openings 1320 (such as opening 1322) of housing portion 1202 to open air. Preferably, the plurality of passages 1316 extend to meet with the openings on the rear side of the speaker basket (such as opening 1314).

Since open air is not enclosed and has a volume that is infinitely large, the sound pressure waves exiting through the plurality of openings 1307 do not substantially interfere with the sound pressure waves exiting through the plurality of openings 1320. Sound pressure waves will travel more freely in open air, and will be impeded from traveling into these openings from open air. Thus, these air spaces may be viewed as being substantially separated from one another.

Figure 14:
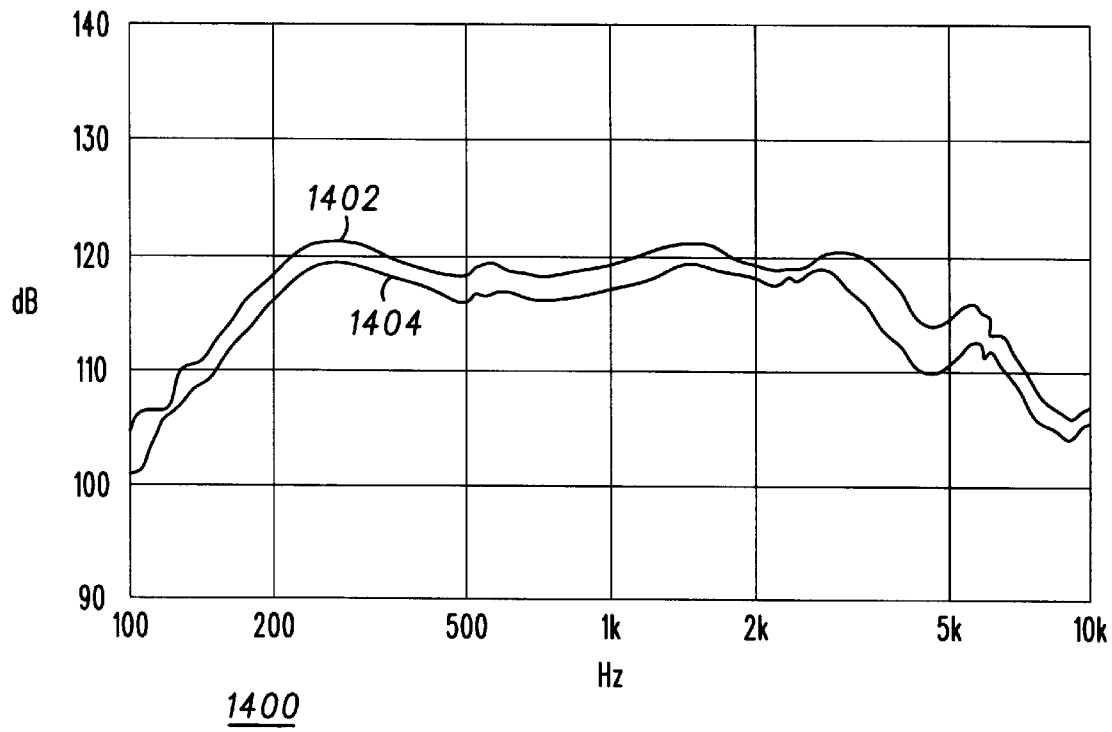
FIG. 14 is a graph showing acoustic frequency responses of the portable radiotelephone of FIGS. 12 and 13 in sealed and unsealed conditions.

FIG. 14 shows a graph 1400 of acoustic frequency response curves 1402 and 1404 of the portable radiotelephone of FIGS. 12 and 13. Acoustic frequency response curve 1402 was obtained where ear placement region 1212 was sealed to the artificial ear, and acoustic frequency response curve 1404 was obtained where ear placement region 1212 was unsealed using the leakage ring adapter. As acoustic frequency response curves 1402 and 1404 reveal, no substantial bass loss or boost occurs in the sealed condition using the portable radiotelephone. The portable radiotelephone provides an acoustic frequency response that is substantially independent of a seal around ear placement region 1212.

Figure 15:
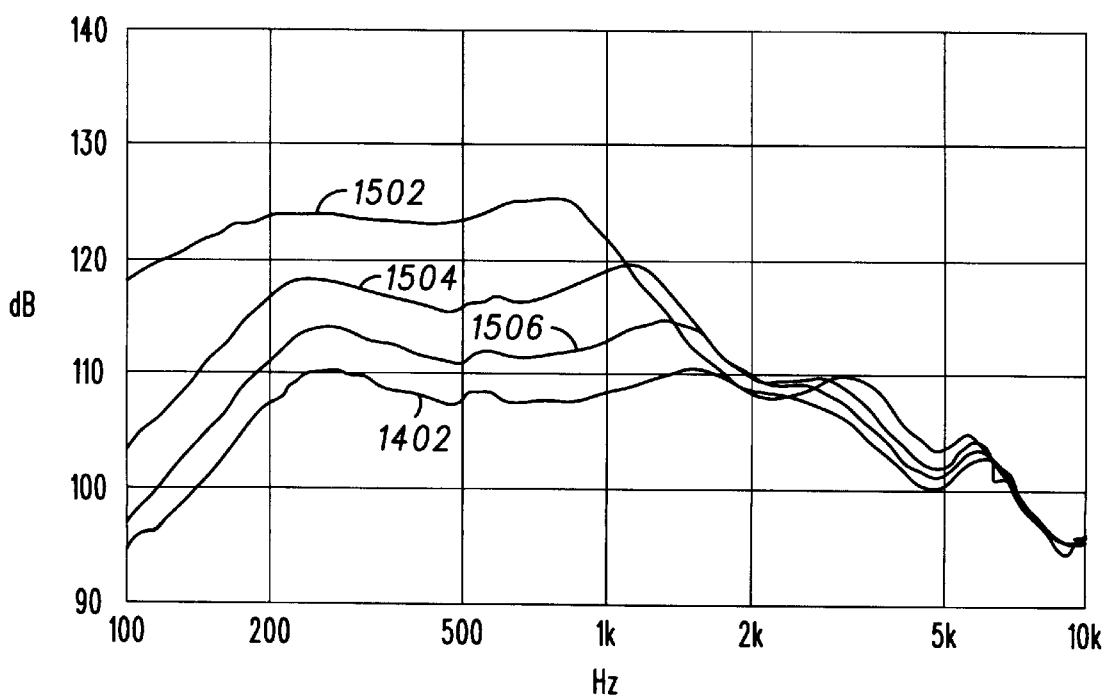
FIG. 15 is a graph showing acoustic frequency responses of the portable radiotelephone of FIGS. 12 and 13 in sealed conditions.

FIG. 15 shows a graph 1500 of acoustic frequency response curves 1402, 1502, 1504, and 1506 of the portable radiotelephone of FIGS. 12 and 13. In general, graph 1500 shows the acoustic effects the plurality of openings 1220 has in the portable radiotelephone. Each of acoustic frequency response curves 1502, 1504, and 1506 was obtained where ear placement region 1212 was sealed to the artificial ear, but also where at least some of the plurality of openings 1220 (FIG. 12) were intentionally blocked so that sound pressure waves would not as freely pass through the upper housing.

Acoustic frequency response curve 1402 of FIG. 15 (also shown in graph 1400 of FIG. 14) was generated where none of the eight plurality of openings 1220 (see FIG. 12) were blocked. Acoustic frequency response curve 1506 was generated where three of the eight plurality of openings 1220 were blocked. Acoustic frequency response curve 1504 was generated where six of the eight plurality of openings 1220 were blocked. Acoustic frequency response curve 1502 was generated where all of the eight plurality of openings 1220 were blocked.

In general, the desired frequency response (here, acoustic frequency response curve 1402) was achieved by tuning the ear volume—which was done here by acoustically coupling the ear volume to open air through a plurality of passages 1304. The size and the number of openings (e.g., the plurality of openings 1220), in combination with the lengths of the passages, were chosen to achieve the desired frequency response (here, acoustic frequency response curve 1402). It is understood that the number and the size of these openings may be chosen in combination with felts, screens, meshes, or other suitable materials that acoustically resist air flow to achieve a desired frequency response. In addition, if housing portion 1204 is used, the size and the number of openings leading to a front side of speaker 1206 (e.g., a plurality of openings 1224), in combination with the lengths of any passages of these openings, may be chosen in combination with felts, screens, meshes, and other suitable materials that acoustically resist air flow to achieve a desired response. Furthermore, the sizes and number of the openings on the rear side of the speaker basket (e.g., opening 1314) may be chosen in combination with any volume of the small cavity (optional), in combination with the lengths and the number of the plurality of passages 1316 and the pluralities of openings 1216 and 1320, in combination with any felts, screens, meshes, or other suitable materials, for the purpose of optimizing the suspension compliance of speaker diaphragm 1302. This combination will also optimize the low frequency performance of speaker 1206. In any of the above described arrangements, felts, screens, meshes, or other suitable materials may be disposed in any passages and/or internal cavities, disposed on inside or outside housing surfaces, on the front or back sides of a speaker, to resist air flow through any openings or passages.

Figure 18:
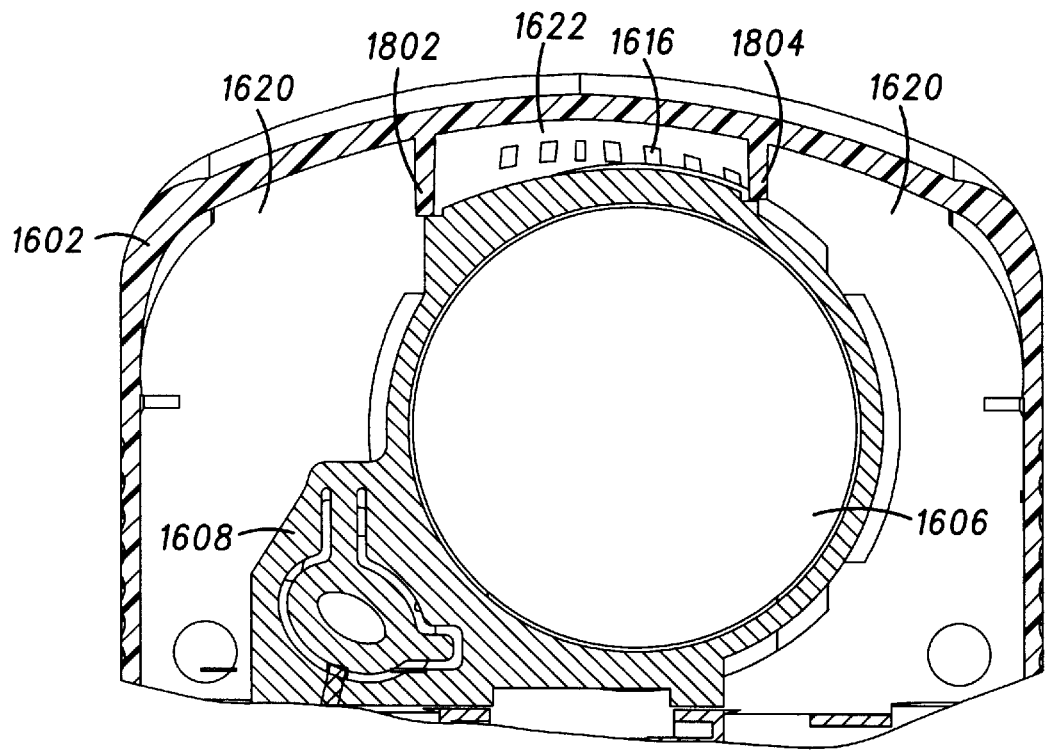
FIG. 18 is a cross sectional view of a portion of the portable radiotelephone of FIG. 16.

FIG. 16 is a cross sectional view of a portion of a portable radiotelephone with a speaker assembly 1600 in a second alternate embodiment. Speaker assembly 1600 includes a housing portion 1602 attached to a housing portion 1604, preferably using suitable methods as described above. A speaker 1606 is disposed between housing portions 1602 and 1604 and has a front side that is substantially sealed and held in place with a spacer 1608. A felt 1612 is positioned between speaker 1606 and housing portion 1604. Internal cavities 1620 and 1622 are formed and substantially separated from each other. An opening 1616, formed on housing portion 1604 and positioned within the ear placement region, leads to internal cavity 1622. An opening 1618, formed on housing portion 1602 and positioned outside the ear placement region (here, on a rear surface of the portable radiotelephone), leads to internal cavity 1622. A rear side of speaker 1606 is exposed to internal cavity 1620. As shown more clearly in the cross sectional view of FIG. 18, walls 1802 and 1804, as well as spacer 1608, help substantially separate internal cavity 1620 from internal cavity 1622.

The portable radiotelephone of FIG. 16 operates similarly and achieves similar effects as the embodiments described above. Sound pressure waves from the front side of speaker 1606 travel through felt 1612 and out of opening 1614 to a first air space in front of the ear placement region. Sound pressure waves from the rear side of speaker 1606 travel to a second air space, internal cavity 1620. When an ear volume is formed, some of the sound pressure waves in the first air space are forced through opening 1616 into a third air space, internal cavity 1622. Some of the sound pressure waves are forced through opening 1618 to a fourth air space, open air.

FIG. 17 is a cross sectional view of a portion of a portable radiotelephone with a speaker assembly 1700 in a third alternate embodiment. Speaker assembly 1700 includes a housing portion 1702 attached to a housing portion 1704, preferably using suitable methods as described above. A speaker 1706 is disposed between housing portions 1702 and 1704 and has a front side that is substantially sealed and held in place with a spacer 1708. A felt 1712 is positioned between speaker 1706 and housing portion 1704. Internal cavities 1720 and 1722 are formed and substantially separated from each other. An opening 1714 within an ear placement region leads to a front side of speaker 1706. Opening 1714 also leads to internal cavity 1722 through a passage 1715 formed between spacer 1708 and housing portion 1704. An opening 1718, formed on housing portion 1702 and positioned outside the ear placement region (here, on a rear surface of the portable radiotelephone), leads to internal cavity 1722. A rear side of speaker 1706 is exposed to internal cavity 1720. Opening 1714 is staggered in relation to opening 1718.

The portable radiotelephone of FIG. 17 operates similarly and achieves similar effects as the embodiments described above. Sound pressure waves from the front side of speaker 1706 travel through felt 1712 and out of opening 1714 to a first air space in front of the ear placement region. Sound pressure waves from the rear side of speaker 1706 travel to a second air space, internal cavity 1720. When an ear volume is formed, some of the sound pressure waves in the first air space are forced through passage 1715 into a third air space, internal cavity 1722, exiting through opening 1718 to open air (a fourth air space).

As shown and described herein, the air spaces may be formed or provided in several ways in many different combinations readily understood. The air spaces may include internal cavities formed by the housing, open air (achieved by passages), or combinations of internal cavities and open air (achieved by passages from the internal cavities to the open air). If the air spaces include internal cavities of the housing, then preferably the air spaces are substantially separated from each other with a separator, such as with a wall or walls or any internal assemblies.

The separation of the air spaces is important so as to isolate sound pressure waves emanating from a front side of a speaker diaphragm from sound pressure waves emanating from a rear side of the speaker diaphragm, as the two sound pressure waves are 180° out of phase with one another. That is, it is important that sound pressure waves emanating from the rear side of the speaker diaphragm to be isolated from an air space in front of an ear placement region.

FIGS. 19–27 are cross sectional views of such additional alternate embodiments of speaker assemblies, placed in close proximity to human ears. In each of these figures, a typical telephone earpiece speaker is shown. Air spaces are designated as $AS_1$, $AS_2$, $AS_3$, etc. Although each of the figures shows an enclosure having a port or passage in front of the speaker, such enclosures and passages are optional. For example, a front side of the speaker may be directly exposed to an ear placement region. Also, the speaker may not include a diaphragm cover and may have a speaker diaphragm exposed to the ear placement region. Any passages may be formed as thick as the general thickness of the housing, or lengthened as acoustically necessary. In FIGS. 19–22 and 24–25, the speaker is supported on and sealed around a gasket. In any of these embodiments, felts, screens, meshes, or other suitable materials may be disposed in any passages and/or internal cavities, disposed on inside or outside housing surfaces, on the front or back sides of a speaker, to resist air flow through any openings and/or passages.

Figures 19, 20:
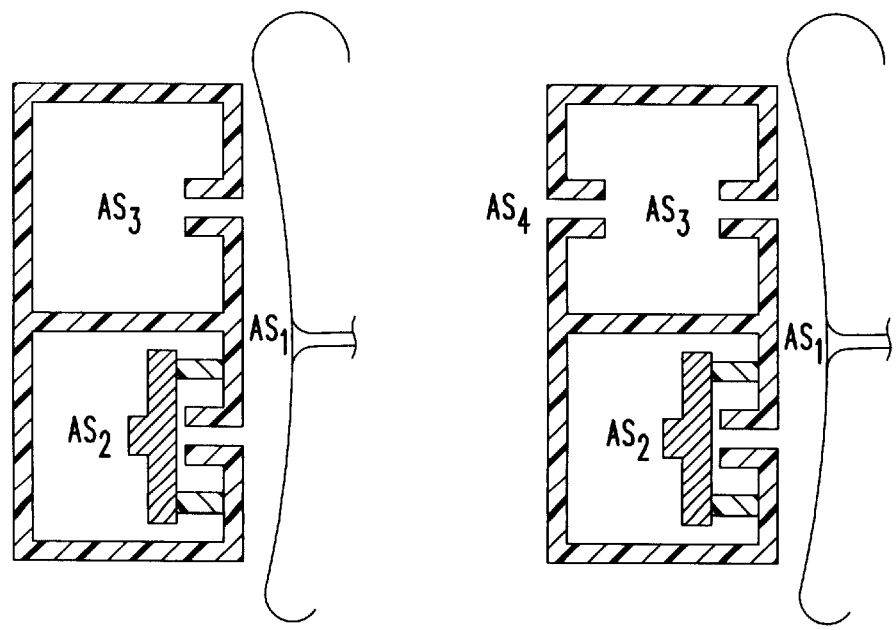
FIGS. 19 through 27 show cross sectional views of other alternate embodiments of portable electronic devices with speaker assemblies.

FIG. 19 shows a speaker assembly of a portable electronic device, where a housing forms a first internal cavity and a second internal cavity separated from the first internal cavity. Sound pressure waves from a front side of a speaker are acoustically coupled to a first air space in front of an ear placement region through a first passage. Sound pressure waves from a rear side of the speaker are acoustically coupled to the first internal cavity (a second air space). The first air space is acoustically coupled to the second internal cavity (a third air space) through a second passage.

FIG. 20 shows a speaker assembly of a portable electronic device, where a housing forms a first internal cavity and a second internal cavity separated from the first internal cavity. Sound pressure waves from a front side of a speaker are acoustically coupled to a first air space in front of an ear placement region through a first passage. Sound pressure waves from a rear side of the speaker are acoustically coupled to the first internal cavity (a second air space). The first air space is acoustically coupled to the second internal cavity (a third air space) through a second passage. The second internal cavity is acoustically coupled to open air (a fourth air space) through a third passage. This embodiment is a simplified version of the embodiments represented in FIGS. 1–8 and FIGS. 16–18 as well.

Figure 21:
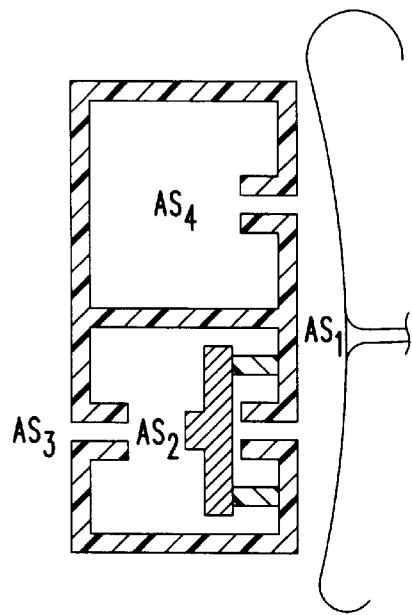

FIG. 21 shows a speaker assembly of a portable electronic device, where a housing forms a first internal cavity and a second internal cavity separated from the first internal cavity. Sound pressure waves from a front side of a speaker are acoustically coupled to a first air space in front of an ear placement region through a first passage. Sound pressure waves from a rear side of the speaker are acoustically coupled to the first internal cavity (a second air space). The first internal cavity is acoustically coupled to open air (a third air space) through a second passage. The first air space is acoustically coupled to the second internal cavity (a fourth air space) through a third passage.

Figure 22:
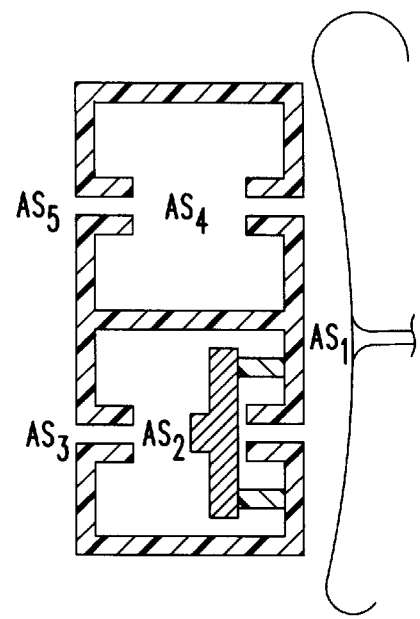

FIG. 22 shows a speaker assembly of a portable electronic device, where a housing forms a first internal cavity and a second internal cavity separated from the first internal cavity. Sound pressure waves from a front side of a speaker are acoustically coupled to a first air space in front of an ear placement region through a first passage. Sound pressure waves from a rear side of the speaker are acoustically coupled to the first internal cavity (a second air space). The first internal cavity is acoustically coupled to open air (a third air space) through a second passage.

The first air space is acoustically coupled to the second internal cavity (a fourth air space) through a third passage. The second internal cavity is acoustically coupled to open air (a fifth air space) through a fourth passage.

Figure 23:
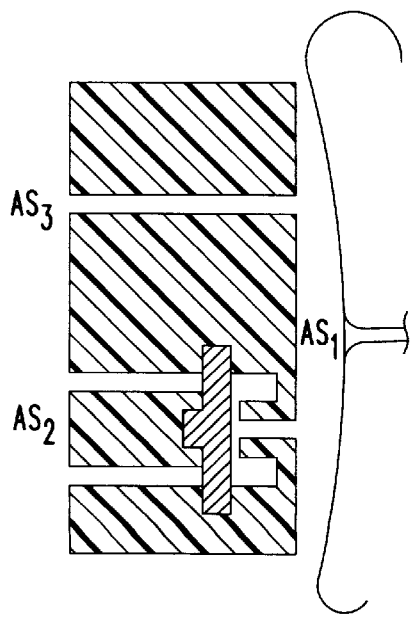

FIG. 23 shows a speaker assembly of a portable electronic device having a housing. Sound pressure waves from a front side of a speaker are acoustically coupled to a first air space in front of an ear placement region through a first passage. Sound pressure waves from a rear side of the speaker are acoustically coupled to open air (a second air space) through a second passage. The first air space is acoustically coupled to open air (a third air space) through a third passage.

Figure 24:
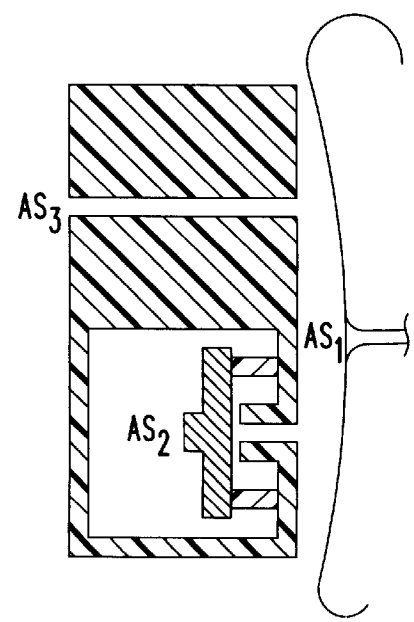

FIG. 24 shows a speaker assembly of a portable electronic device, where a housing forms a first internal cavity. Sound pressure waves from a front side of a speaker are acoustically coupled to a first air space in front of an ear placement region through a first passage. Sound pressure waves from a rear side of the speaker are acoustically coupled to the first internal cavity (a second air space). The first air space is acoustically coupled to open air (a third air space) through a second passage.

Figure 25:
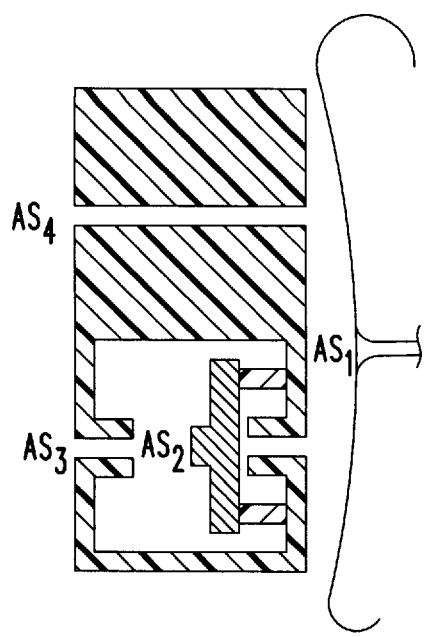

FIG. 25 shows a speaker assembly of a portable electronic device, where a housing forms a first internal cavity. Sound pressure waves from a front side of a speaker are acoustically coupled to a first air space in front of an ear placement region through a first passage. Sound pressure waves from a rear side of the speaker are acoustically coupled to the first internal cavity (a second air space). The first internal cavity is acoustically coupled to open air (a third air space) through a second passage.

The first air space is acoustically coupled to open air (a third air space) through a third passage. This embodiment is a simplified version of the embodiment represented in FIGS. 12–13.

Figure 26:
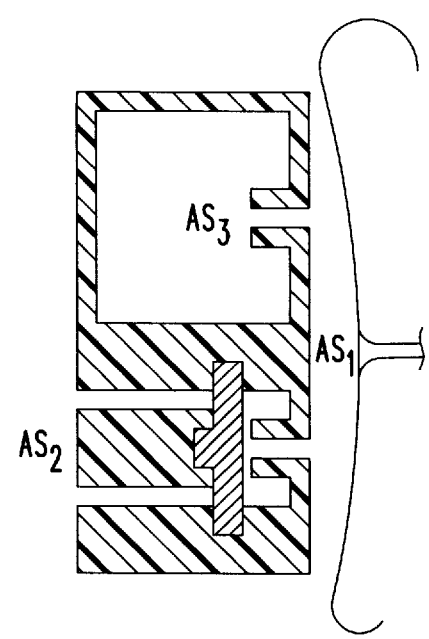

FIG. 26 shows a speaker assembly of a portable electronic device, where a housing forms a first internal cavity. Sound pressure waves from a front side of a speaker are acoustically coupled to a first air space in front of an ear placement region through a first passage. Sound pressure waves from a rear side of the speaker are acoustically coupled to open air (a second air space) through a second passage. The first air space is acoustically coupled to the first internal cavity (a third air space) through a third passage.

Figure 27:
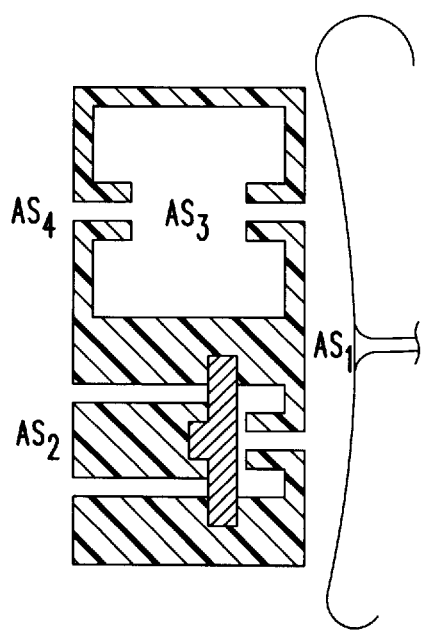

FIG. 27 shows a speaker assembly of a portable electronic device, where a housing forms a first internal cavity. Sound pressure waves from a front side of a speaker are acoustically coupled to a first air space in front of an ear placement region through a first passage. Sound pressure waves from a rear side of the speaker are acoustically coupled to open air (a second air space) through a second passage. The first air space is acoustically coupled to the first internal cavity (a third air space) through a third passage. The first internal cavity is acoustically coupled to open air (a fourth air space) through a fourth passage.

Since it is important for portable electronic devices to maintain a cosmetically appealing exterior, some of the embodiments described herein are preferred over others.

While particular embodiments of the present invention have been shown and described, modifications may be made. It is therefore intended in the appended claims to cover all such changes and modifications which fall within the true spirit and scope of the invention.

What is claimed is:

1. A portable electronic device with a speaker assembly, said portable electronic device comprising:

a housing having an ear placement region forming an ear volume between the ear placement region and a user, the ear volume being external to the device and said housing configured to carry at least one of a receiver and a transmitter;

a speaker, said speaker having a front side acoustically coupled to the ear volume, said speaker having a rear side acoustically coupled to a second air space; and at least a first passage in said housing, said at least a first passage acoustically coupling the ear volume to a third air space substantially separated from the second air space, wherein the acoustic coupling via said at least a first passage includes coupling an external signal, output from the front side of said speaker, from the ear volume back into the third air space.

2. The portable electronic device according to claim 1, wherein said housing has at least a first internal cavity comprising the second air space.

3. The portable electronic device according to claim 1, wherein said housing has at least a first internal cavity comprising the third air space.

4. The portable electronic device according to claim 3, further comprising:

at least a second passage formed in said housing, said at least a second passage acoustically coupling said at least a first internal cavity to a fourth air space.

5. The portable electronic device according to claim 4, wherein the fourth air space comprises open air.

6. The portable electronic device according to claim 4, wherein said housing has at least a second internal cavity comprising the second air space.

7. The portable electronic device according to claim 3, wherein the second air space comprises open air.

8. The portable electronic device according to claim 3, further comprising:

at least a second passage formed in said housing, said at least a second passage acoustically coupling said at least a first internal cavity to a fourth air space.

9. The portable electronic device according to claim 8, wherein the fourth air space comprises open air.

10. The portable electronic device according to claim 8, wherein said housing has at least a second internal cavity comprising the fourth air space.

11. The portable electronic device according to claim 2, wherein the third air space comprises open air.

12. The portable electronic device according to claim 1, wherein said housing has at least a first internal cavity comprising the second air space and at least a second internal cavity comprising the third air space.

13. The portable electronic device according to claim 12, further comprising:
at least a second passage formed in said housing, said at least a second passage acoustically coupling said at least a first internal cavity to a fourth air space.

14. The portable electronic device according to claim 13, wherein the fourth air space comprises open air.

15. The portable electronic device according to claim 13, wherein said housing has at least a third internal cavity comprising the fourth air space.

16. The portable electronic device according to claim 12, further comprising:
at least a second passage formed in said housing, said at least a second passage acoustically coupling said at least a second internal cavity to a fourth air space.

17. The portable electronic device according to claim 16, wherein the fourth air space comprises open air.

18. The portable electronic device according to claim 16, wherein said housing has at least a third internal cavity comprising the fourth air space.

19. The portable electronic device according to claim 12, further comprising:
at least a second passage formed in said housing, said at least a second passage acoustically coupling said at least a first internal cavity to a fourth air space; and
at least a third passage formed in said housing, said at least a third passage acoustically coupling said at least a second internal cavity to a fifth air space.

20. The portable electronic device according to claim 19, wherein the fourth air space comprises open air.

21. The portable electronic device according to claim 19, wherein the fifth air space comprises open air.

22. The portable electronic device according to claim 19, wherein the fourth and the fifth air spaces comprise open air.

23. The portable electronic device according to claim 19, wherein said housing has at least a third cavity comprising the fourth air space.

24. The portable electronic device according to claim 19, wherein said housing has at least a third cavity comprising the fifth air space.

25. The portable electronic device according to claim 1, wherein the second air space comprises open air.

26. The portable electronic device according to claim 1, wherein the third air space comprises open air.

27. The portable electronic device according to claim 1, wherein the second and the third air spaces comprise open air.

28. A portable electronic device with a speaker assembly, said portable electronic device comprising:
a housing having an ear placement region forming an ear volume between the ear placement region and a user, the ear volume being external to the device and said housing configured to carry at least one of a receiver and a transmitter;
a speaker;
at least a first opening, said at least a first opening leading from the ear volume to a front side of said speaker;
at least a first passage, said at least a first passage leading from a rear side of said speaker to a second air space; and
at least a second passage, said at least a second passage having at least a second opening positioned within said ear placement region, said at least a second passage leading from said at least a second opening to a third air space substantially separate from the second air space, wherein said at least a second passage acoustically couples an external signal, output from the front side of said speaker, from the ear volume back into the third air space.

29. The portable electronic device according to claim 28, wherein said housing forms at least a first internal cavity comprising the second air space.

30. The portable electronic device according to claim 28, wherein said housing forms at least a first internal cavity comprising the third air space.

31. The portable electronic device according to claim 28, wherein said housing forms at least a first internal cavity comprising the second air space and at least a second internal cavity comprising the third air space.

32. The portable electronic device according to claim 28, wherein said at least a first passage leads to at least a third opening positioned outside of said ear placement region, such that the second air space comprises open air.

33. The portable electronic device according to claim 28, wherein said at least a second passage leads to at least a third opening positioned outside of said ear placement region, such that the third air space comprises open air.

34. The portable electronic device according to claim 28, wherein said at least a first passage leads to at least a third opening positioned outside of said ear placement region, such that the second air space comprises open air, and wherein said at least a second passage leads to at least a fourth opening positioned outside of said ear placement region, such that the third air space comprises open air.

35. A portable electronic device, comprising:
a housing having an ear placement region forming an ear volume between the ear placement region and a user, the ear volume being external to the device and said housing configured to carry at least one of a receiver and a transmitter;
a speaker;
at least a first opening positioned within the ear placement region of said housing, said at least a first opening leading to a front side of said speaker;
at least a second opening positioned outside of said ear placement region, said at least a second opening leading to a rear side of said speaker; and
at least a third opening positioned within said ear placement region, said at least a third opening coupling the ear volume to an air space substantially separate from the rear side of said speaker, wherein the third opening couples an external signal, output from the front side of said speaker, from the ear volume back into the air space.

36. The portable electronic device according to claim 35, wherein said at least a second opening is positioned on a rear surface of said housing.

37. The portable electronic device according to claim 35, wherein said at least a second opening is positioned on at least one of a left side surface and a right side surface of said housing.

38. The portable electronic device according to claim 35, wherein said at least a second opening is positioned on a front surface of said housing.

39. A portable electronic device, comprising:
a housing having an ear placement region forming an ear volume between the ear placement region and a user, the ear volume being external to the device and said housing having a first internal cavity and configured to carry at least one of a receiver and a transmitter;
a speaker having a rear side acoustically coupled to the first internal cavity, said speaker carried by said housing;

at least a first opening positioned within said ear placement region of said housing, said at least a first opening leading to a front side of said speaker; and at least a first passage, said at least a first passage having at least a second opening positioned within said ear placement region and at least a third opening positioned outside of said ear placement region, wherein said at least a second opening acoustically couples the ear volume to an air space substantially separate from the first internal cavity, and acoustically couples an external signal, output from the front side of the speaker, from the ear volume back into the air space substantially separate from the first internal cavity.

40. The portable electronic device according to claim 39, wherein said at least a third opening is positioned on a rear surface of said housing.

41. The portable electronic device according to claim 39, wherein said at least a third opening is positioned on at least one of a left side surface and a right side surface of said housing.

42. The portable electronic device according to claim 39, wherein said at least a third opening is positioned on a front surface of said housing.

43. A portable radiotelephone, comprising:

a housing, said housing configured to carry at least one of a receiver and a transmitter, said housing having an ear placement region on a front surface thereof, the ear placement region forming an ear volume, external to the radiotelephone, between the ear placement region and a user;

a separator, said separator configured to separate said housing into at least a first internal cavity and a second internal cavity substantially separate from the first internal cavity;

a speaker, said speaker disposed in said housing, said speaker having a rear side exposed to said first internal cavity;

at least a first opening, said at least a first opening positioned within said ear placement region, said at least a first opening leading to a front side of said speaker; and at least a second opening, said at least a second opening positioned within said ear placement region, said at least a second opening leading to said second internal cavity, wherein said at least a second opening couples an external signal, output from the front side of said speaker, to the second internal cavity.

44. The portable radiotelephone according to claim 43, wherein said separator comprises a wall of said housing.

45. The portable radiotelephone according to claim 43, wherein said ear placement region comprises an earcup.

46. The portable radiotelephone according to claim 43, further comprising:

at least a third opening, said at least a third opening positioned outside of said ear placement region, said at least a third opening leading to said second internal cavity.

47. The portable radiotelephone according to claim 43, further comprising:

at least a third opening, said at least a third opening positioned on at least one of a left side surface and a right side surface of said housing, said at least a third opening leading to said second internal cavity.

48. The portable radiotelephone according to claim 43, further comprising:

at least a third opening, said at least a third opening positioned on a rear surface of said housing, said at least a third opening leading to said second internal cavity.

49. The portable radiotelephone according to claim 43, further comprising:

at least a third opening, said at least a third opening positioned outside of said ear placement region, said at least a third opening leading to said second internal cavity.

50. The portable radiotelephone according to claim 43, further comprising:

at least a third opening, said at least a third opening positioned outside of said ear placement region, said at least a third opening leading to said first internal cavity.

51. The portable radiotelephone according to claim 43, further comprising:

at least a third opening, said at least a third opening positioned on at least one of a left side surface and a right side surface of said housing, said at least a third opening leading to said first internal cavity.

52. The portable radiotelephone according to claim 43, further comprising:

at least a third opening, said at least a third opening positioned on a rear surface of said housing, said at least a third opening leading to said first internal cavity.

53. The portable radiotelephone according to claim 43, further comprising:

at least a third opening, said at least a third opening positioned on said front surface outside of said ear placement region, said at least a third opening leading to said first internal cavity.

* * * * *